US012157314B2

(12) United States Patent
Kanegae et al.

(10) Patent No.: US 12,157,314 B2
(45) Date of Patent: Dec. 3, 2024

(54) LIQUID EJECTING HEAD AND LIQUID EJECTING APPARATUS

(71) Applicant: SEIKO EPSON CORPORATION, Tokyo (JP)

(72) Inventors: Takahiro Kanegae, Shiojiri (JP); Katsuhiro Okubo, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 142 days.

(21) Appl. No.: 18/150,170

(22) Filed: Jan. 4, 2023

(65) Prior Publication Data

US 2023/0211607 A1 Jul. 6, 2023

(30) Foreign Application Priority Data

Jan. 6, 2022 (JP) ................................. 2022-000912

(51) Int. Cl.
*B41J 2/14* (2006.01)

(52) U.S. Cl.
CPC ....... *B41J 2/14201* (2013.01); *B41J 2/14016* (2013.01); *B41J 2002/14491* (2013.01)

(58) Field of Classification Search
CPC ................ B41J 2/14201; B41J 2/14016; B41J 2002/14491; B41J 2002/14419; B41J 2202/19; B41J 2202/20; B41J 2/14
See application file for complete search history.

(56) References Cited

U.S. PATENT DOCUMENTS

2017/0291417 A1* 10/2017 Okubo ................. B41J 2/14072

FOREIGN PATENT DOCUMENTS

JP 2017-189897 A 10/2017

* cited by examiner

*Primary Examiner* — Bradley W Thies
(74) *Attorney, Agent, or Firm* — WORKMAN NYDEGGER

(57) ABSTRACT

A liquid ejecting head includes: multiple head chips; a first board that is a rigid board coupled to multiple flexible boards mounted on the respective head chips; and a second board that is disposed opposite the head chips with the first board therebetween and that is a rigid board provided with a connector. The first board has a first and second board-to-board connectors; the second board has a third and fourth board-to-board connectors. The first board-to-board connector mates with the third board-to-board connector so that the first board-to-board connector is coupled to the third board-to-board connector. The second board-to-board connector mates with the fourth board-to-board connector so that the second board-to-board connector is coupled to the fourth board-to-board connector. The connector is electrically coupled to both the third and fourth board-to-board connectors.

15 Claims, 14 Drawing Sheets

LIQUID EJECTING HEAD AND LIQUID EJECTING APPARATUS

The present application is based on, and claims priority from JP Application Serial Number 2022-000912, filed Jan. 6, 2022, the disclosure of which is hereby incorporated by reference herein in its entirety.

BACKGROUND

1. Technical Field

The present disclosure relates to liquid ejecting heads and liquid ejecting apparatuses.

2. Related Art

Liquid ejecting apparatuses, represented by ink jet printers, typically include a liquid ejecting head, in which a plurality of head chips having respective flexible boards discharge liquid such as ink to the outside. JP-A-2017-189897 discloses an example of such liquid ejecting heads, which includes: a circuit board coupled to the flexible boards of the head chips; and a relay board that is coupled to the circuit board and has a single connector to be coupled to an external wiring member. Each of the circuit board and the relay board is a rigid board. The relay board is elongated substantially in the liquid discharge direction. In this liquid ejecting head, the flexible boards of the head chips are combined into the connector.

Since the flexible boards of the head chips are combined into the connector, as described above, the relay board may be elongated substantially in the liquid discharge direction. The liquid ejecting head, therefore, tends to upsize in the liquid discharge direction.

SUMMARY

According to a first aspect of the present disclosure, a liquid ejecting head includes: a plurality of head chips that discharge liquid in a first direction; a first board that is a rigid board coupled to a plurality of flexible boards mounted on the respective head chips; and a second board disposed opposite the plurality of head chips with the first board therebetween, the second board being a rigid board provided with a connector to be coupled to an external wiring member. The first board has a first board-to-board connector coupled to the second board and a second board-to-board connector coupled to the second board. The second board has a third board-to-board connector coupled to the first board and a fourth board-to-board connector coupled to the first board. The first board-to-board connector mates with the third board-to-board connector so that the first board-to-board connector is coupled to the third board-to-board connector. The second board-to-board connector mates with the fourth board-to-board connector so that the second board-to-board connector is coupled to the fourth board-to-board connector. The connector is electrically coupled to both the third board-to-board connector and the fourth board-to-board connector.

According to a second aspect of the present disclosure, a liquid ejecting apparatus includes: the liquid ejecting head according to the first aspect; and the external wiring member that is disposed outside the liquid ejecting head and that is coupled to the connector of the liquid ejecting head.

DESCRIPTION OF EXEMPLARY EMBODIMENTS

Some embodiments of the present disclosure will be described below with reference to the accompanying drawings. It should be noted that the sizes and scales of individual components in each figure are differed from the actual ones as appropriate. The embodiments described below are proper concrete examples of the present disclosure which have various technical and suitable modifications. However, the scope of the present disclosure is not limited to those embodiments unless it is specifically stated that the present disclosure is limited in the following description.

For convenience's sake, the following description will be given using X-, Y-, and Z-axes, which are orthogonal to one another. One direction along the X-axis is defined as a direction X1, whereas the direction opposite to the direction X1 is defined as the direction X2. Likewise, the two directions along the Y-axis are defined as the directions Y1 and Y2; the two directions along the Z-axis are defined as the directions Z1 and Z2. The expression "as viewed in the direction Z1 or the direction Z2" is also referred to as the "in plan view". The direction Z2 corresponds to a first direction.

1. First Embodiment

1-1. Overall Configuration of Liquid Ejecting Apparatus

Figure 1:
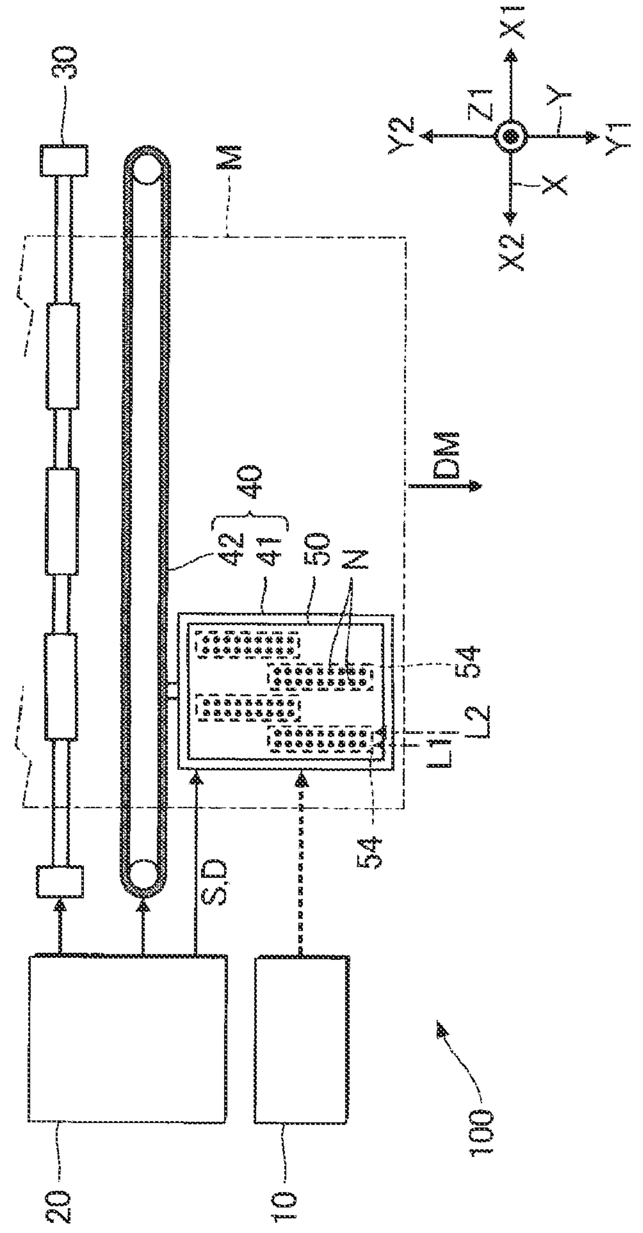
FIG. 1 is a schematic view of a liquid ejecting apparatus according to a first embodiment of the present disclosure.

FIG. 1 is a schematic view of a liquid ejecting apparatus 100 according to a first embodiment of the present disclosure. The liquid ejecting apparatus 100 may be an ink jet printer that discharges ink onto a medium M in droplet form. The ink is an example of liquid; the medium M is a print target made of paper, resin, fabric, or other material.

As illustrated in FIG. 1, the liquid ejecting apparatus 100 includes a liquid storage 10, a control unit 20, a transport mechanism 30, a moving mechanism 40, and a liquid ejecting head 50.

The liquid storage 10 may be a container that stores ink. Specific examples of the liquid storage 10 include a cartridge to be removably attached to the liquid ejecting apparatus 100, an ink pack made of a flexible film, and a rechargeable ink tank.

Although not illustrated in the drawings, the liquid storage 10 may have a plurality of containers that store different types (colors and compositions) of ink and process liquid. Examples of the colors of the ink stored in the containers include, but are not limited to, cyan, magenta, yellow, black, transparent, and white. Of these colors of ink, two or more may be used together. Examples of the compositions of the ink include, but are not limited to, a water-based type formed by dissolving a color material such as dye or pigment in a water-based solvent, a solvent-based type formed by dissolving a color material in an organic solvent, and an ultraviolet (UV) curable type.

In this embodiment, four colored inks, such as cyan ink, magenta ink, yellow ink, and black ink, may be used.

The control unit 20 controls the operations of individual components in the liquid ejecting apparatus 100. The control unit 20 may include: a processing circuit such as a central processing unit (CPU) or a field-programmable gate array (FPGA); and a memory circuit such as a semiconductor memory. The control unit 20 outputs a drive signal D and a control signal S to the liquid ejecting head 50. The drive signal D is a pulse signal used to drive the drive elements in the liquid ejecting head 50; the control signal S is used to instruct whether to supply the drive signal D to the drive elements.

The transport mechanism 30 transports the medium M in a transport direction DM, or in the direction Y1 of FIG. 1, under the control of the control unit 20. The moving mechanism 40 moves the liquid ejecting head 50 in both the directions X1 and X2 under the control of the control unit 20. As in the example of FIG. 1, the moving mechanism 40 may include: a support body 41, also referred to as the carriage, that is a substantially rectangular box that accommodates the liquid ejecting head 50; and a transport belt 42 to which the support body 41 is fixed. The support body 41 may also accommodate the liquid storage 10 in addition to the liquid ejecting head 50.

The liquid ejecting head 50 includes a plurality of head chips 54, details of which will be described later. The liquid ejecting head 50 is supplied with the ink from the liquid storage 10 and then discharges the ink onto the medium M in an ink discharge direction, or the direction Z2, via a plurality of nozzles N in the head chips 54, under the control of the control unit 20. More specifically, the liquid ejecting head 50 discharges the ink onto a surface of the medium M in parallel with the transport of the medium M with the transport mechanism 30 and the reciprocation of the liquid ejecting head 50 with the moving mechanism 40, thereby forming a desired image on the surface. The liquid ejecting head 50 may have a rectangular or substantially rectangular shape in plan view. In this case, the expression "substantially rectangular shape" conceptionally implies any shape resembling a rectangle. As an example, a substantially rectangular shape is a square having chamfered or rounded corners. As an example, a shape resembling a rectangle is an octagonal shape formed of: four long sides; and four shorter sides connecting them.

1-2. Mounting of Liquid Ejecting Head

Figure 2:
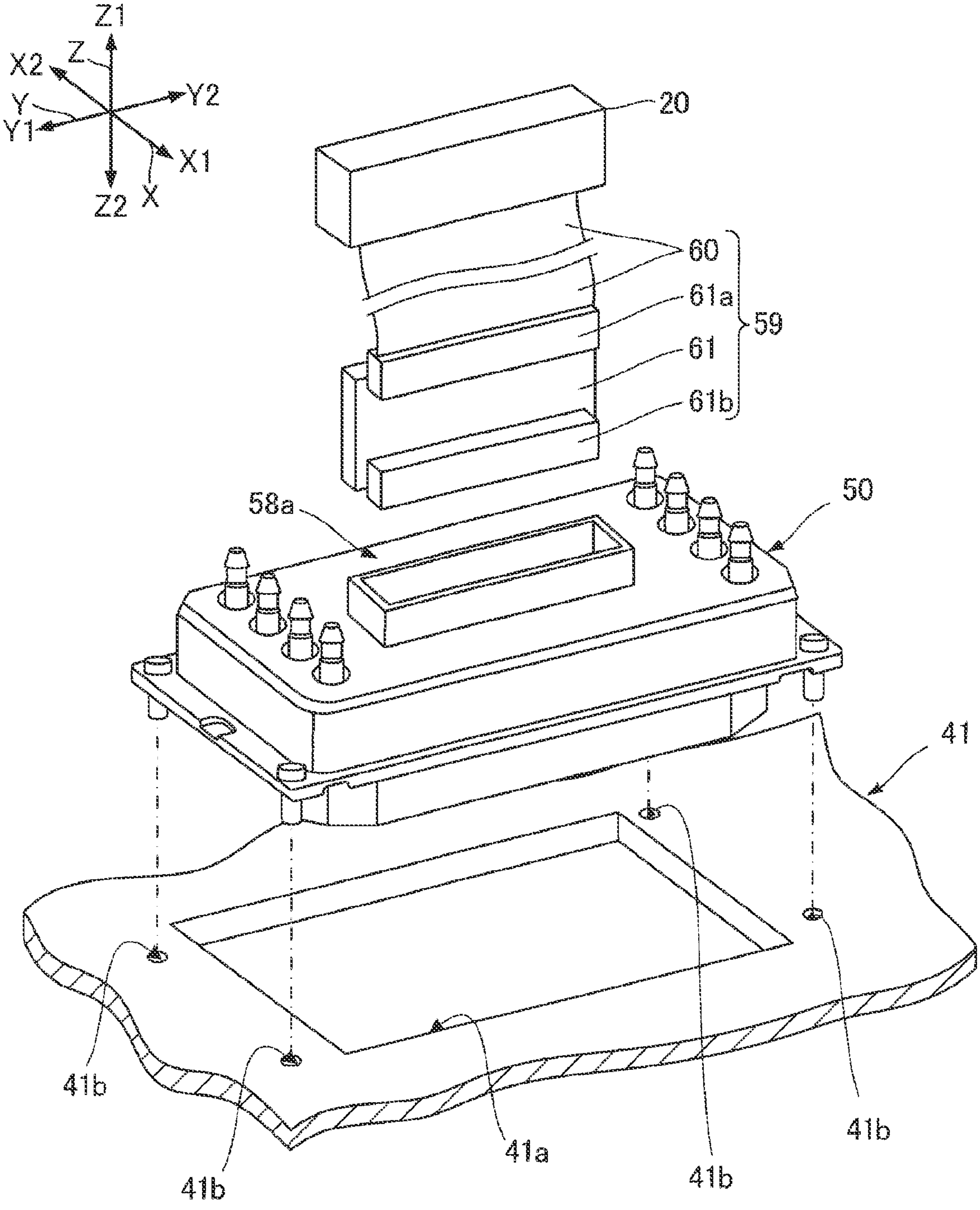
FIG. 2 is a perspective view of the liquid ejecting head and the support body.

FIG. 2 is a perspective view of the liquid ejecting head 50 and the support body 41 according to the first embodiment. As illustrated in FIG. 2, the liquid ejecting head 50 is supported on the support body 41. The support body 41, which serves as a support member for the liquid ejecting head 50, may be a substantially rectangular carriage in this embodiment. The support body 41 may be made of a metal material, such as stainless steel, aluminum, titanium, or a magnesium alloy.

The support body 41 includes an aperture 41*a* and a plurality of screw holes 41*b*. In this embodiment, the support body 41 may have a substantially rectangular shape with a planar bottom having the aperture 41*a* and the screw holes 41*b*. The liquid ejecting head 50 is fixed to the support body 41 by threading the screws into the respective screw holes 41*b* while inserted into the aperture 41*a*. In this way, the liquid ejecting head 50 is mounted on the support body 41.

As in the example of FIG. 2, a single liquid ejecting head 50 may be mounted on the support body 41. Alternatively, a plurality of liquid ejecting heads 50 may be mounted on the support body 41, in which case it is necessary to form a plurality of apertures 41*a* in the support body 41 in conformity with the number and shape of the apertures 41*a*.

1-3. Configuration of Liquid Ejecting Head

Figure 3:
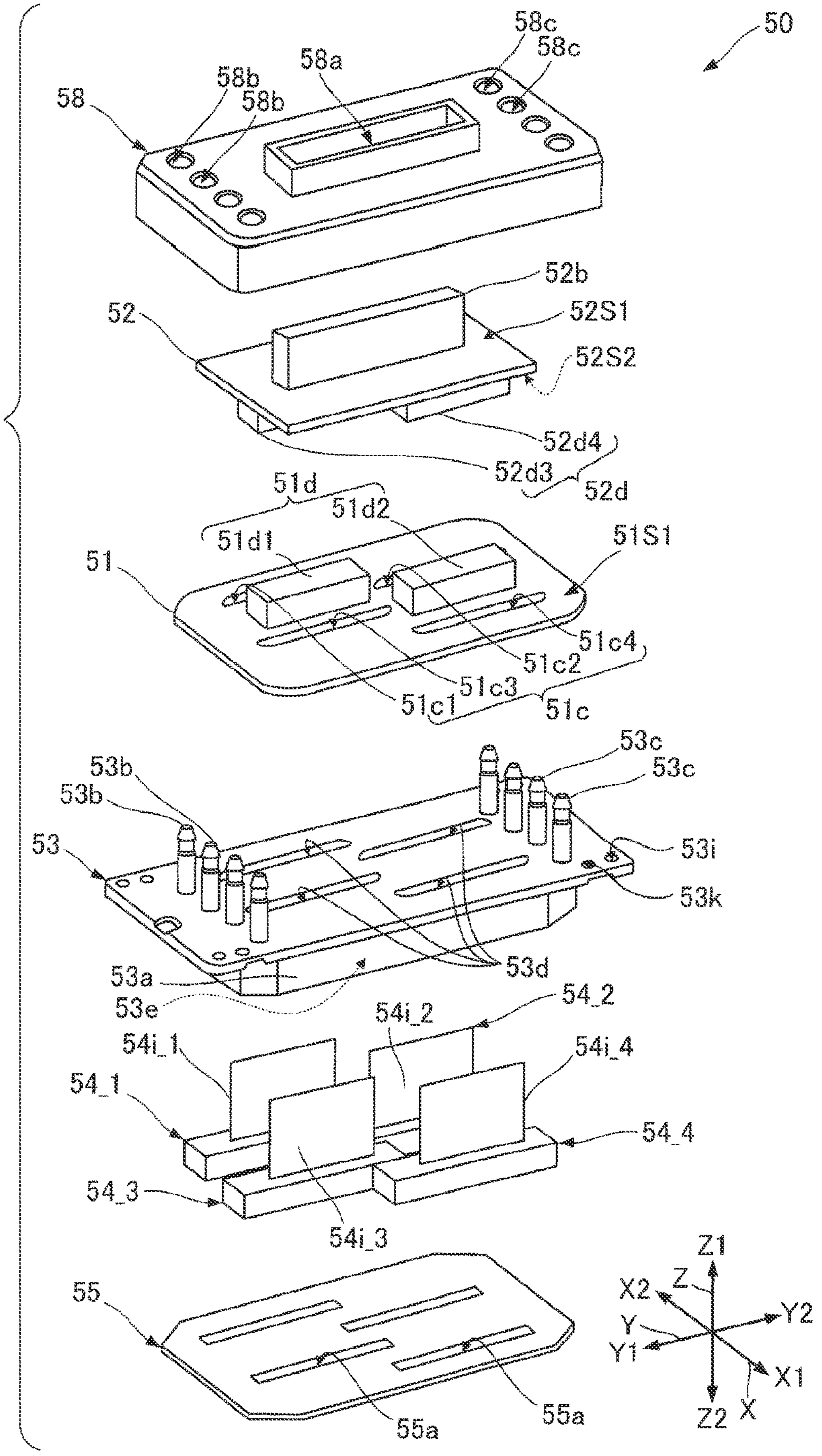
FIG. 3 is an exploded perspective view of the liquid ejecting head.

FIG. 3 is an exploded perspective view of the liquid ejecting head 50 according to the first embodiment. As illustrated in FIG. 3, the liquid ejecting head 50 includes a circuit board 51, a relay board 52, a channel structure 53, four head chips 54_1 to 54_4, a fixing plate 55, and a cover 58. Further, the cover 58, the relay board 52, the circuit board 51, the channel structure 53, the head chips 54, and the fixing plates 55 are disposed in this order in the direction Z2. Hereinafter, the components of the liquid ejecting head 50 will be described in sequence. The circuit board 51 is an example of a first board; the relay board 52 is an example of a second board; and the head chips 54_1 to 54_4 are an example of a plurality of head chips. The head chip 54_1 is an example of a first head chip; the head chip 54_2 is an example of a second head chip; the head chip 54_3 is an example of a third head chip; and the head chip 54_4 is an example of a fourth head chip.

The circuit board 51 is a mounted component used to electrically couple the liquid ejecting head 50 to the control unit 20. The circuit board 51 includes wires formed thereon to supply various control signals and a source voltage to the head chips 54_1 to 54_4. The circuit board 51 may be a planar member widened in substantially parallel to the X-Y plane, and a thickness direction of the circuit board 51 is identical to a direction along the Z-axis. The circuit board 51 may be made of a rigid body, examples of which include a glass epoxy board, a glass composite board, and a composite board. The circuit board 51 may have a rectangular or substantially rectangular outer shape in plan view.

The circuit board 51 further includes four apertures 51*c* and two board-to-board connectors 51*d*. For convenience's sake, a board-to-board connector is abbreviated below as a B-to-B connector. A B-to-B connector is used to directly couple two boards. In this embodiment, each B-to-B connector may employ a straight type in which, after it is joined to a board, its joint surface is substantially parallel to the surface of the board. The B-to-B connectors 51*d* are mounted on a surface 51S1 of the circuit board 51 which faces in the direction Z1. Details of the circuit board 51 will be described below with reference to FIG. 4.

Figure 4:
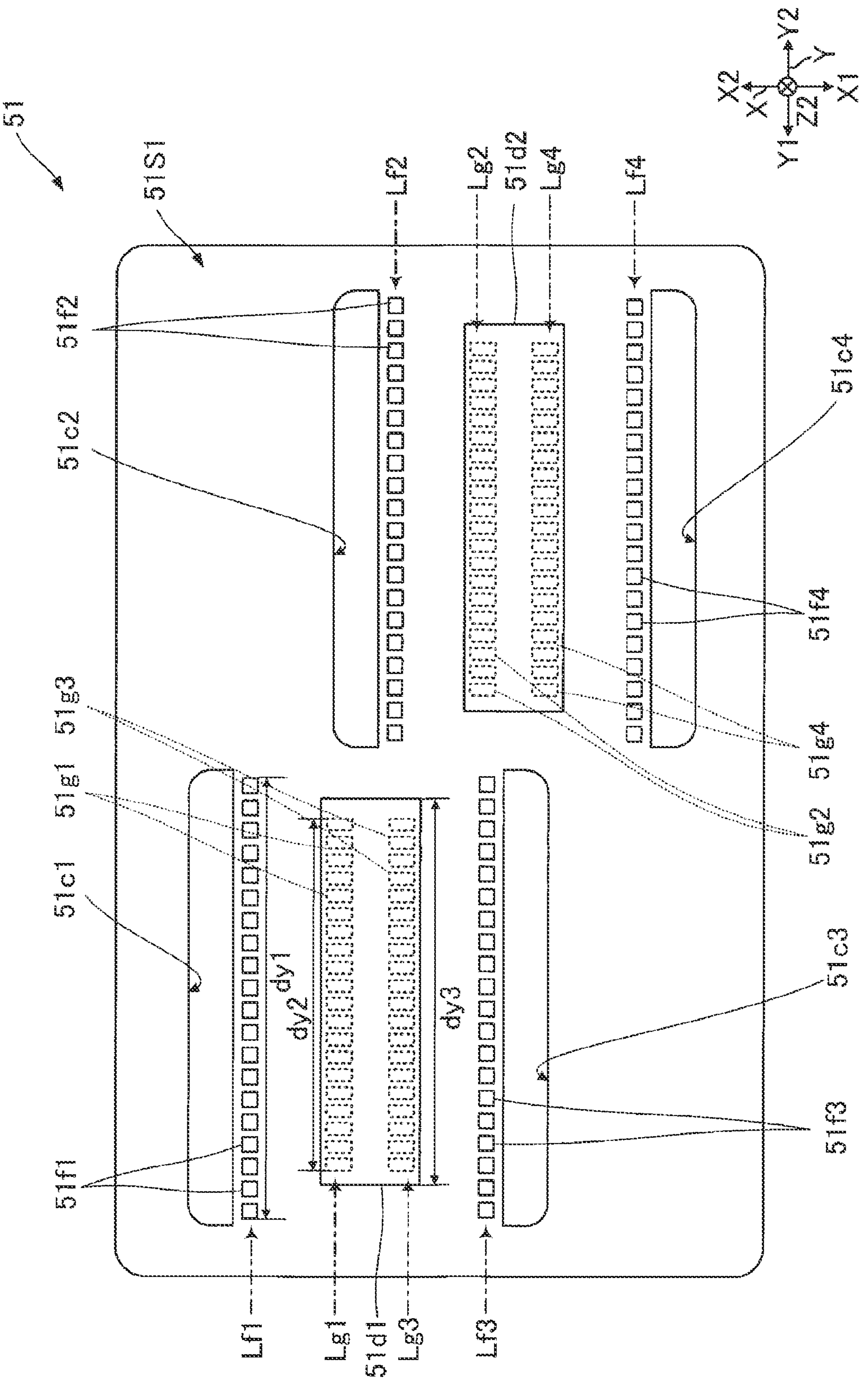
FIG. 4 is a plan view of the circuit board as viewed in the first direction.

FIG. 4 is a plan view of the circuit board 51 as viewed in the direction Z2. The circuit board 51 includes apertures 51*c*1, 51*c*2, 51*c*3, and 51*c*4 as the apertures 51*c*. The apertures 51*c*1, 51*c*2, 51*c*3, and 51*c*4 are disposed in this order in the direction X1. One direction along the X-axis, or the direction X1 or X2, is an example of a second direction. Each aperture 51*c* is elongated along the Y-axis. The apertures 51*c*1 and 51*c*3 are formed at a substantially identical location in one direction along the Y-axis. Likewise, the apertures 51*c*2 and 51*c*4 are formed at a substantially identical location in one direction along the Y-axis. The expression "substantially identical" implies a case where two objects are completely the same as each other, as well as a case where two objects can be regarded as being the same as each other in consideration of manufacturing errors. One direction along the Y-axis, or the direction Y1 or Y2, is an example of a third direction.

The circuit board 51 further includes a first B-to-B connector **51*d*1 and a second B-to-B connector 51*d*2 as the B-to-B connectors 51*d*. Each B-to-B connector 51*d* is elongated in plan view in one direction along the Y-axis. The first B-to-B connector 51*d*1 is formed between the apertures 51*c*1 and 51*c*3, whereas the second B-to-B connector 51*d*2 is formed between the apertures 51*c*2 and 51*c*4. The first B-to-B connector 51*d*1 is an example of a first board-to-board connector; the second B-to-B connector 51*d*2** is an example of a second board-to-board connector.

The surface 51S1 of the circuit board 51 is provided with terminal arrays Lf1, Lf2, Lf3, and Lf4. The terminal array Lf1 is formed of a plurality of terminals **51*f*1; the terminal array LF2 is formed of a plurality of terminals 51*f*2; the terminal array LF3 is formed of a plurality of terminals 51*f*3; and the terminal array LF4 is formed of a plurality of terminals 51*f*4. The terminal array Lf1 is formed between the aperture 51*c*1 and the first B-to-B connector 51*d*1, namely, along the rim of the aperture 51*c* on the direction X1 side. Likewise, the terminal array Lf2 is formed between the aperture 51*c*2 and the second B-to-B connector 51*d*2, namely, along the rim of the aperture 51*c*2 on the direction X1 side. The terminal array Lf3 is formed between the aperture 51*c*3 and the first B-to-B connector 51*d*1, namely, along the rim of the aperture 51*c*3 on the direction X2 side. The terminal array Lf4 is formed between the aperture 51*c*4 and the second B-to-B connector 51*d*2, namely, along the rim of the aperture 51*c*4** on the direction X2 side.

The first B-to-B connector **51*d*1 includes: a terminal array Lg1 formed of a plurality of terminals 51*g*1; and a terminal array Lg3 formed of a plurality of terminals 51*g*3. In plan view, the terminal array Lg1 is formed on the direction X2 side of the first B-to-B connector 51*d*1, whereas the terminal array Lg3 is formed on the direction X1 side of the first B-to-B connector 51*d*1. Of each terminal 51*g*1, a first end is routed out of the housing of the first B-to-B connector 51*d*1 and fixed on the surface 51S1 of the circuit board 51, and a second end is coupled to a corresponding terminal (not illustrated) of a third B-to-B connector 52*d*3 on the relay board 52. The terminals 51*g*1 are coupled to the respective terminals 51*f*1 via wires (not illustrated) formed on the circuit board 51. In short, the terminals 51*g*1 are electrically coupled to the respective terminals 51*f*1. Likewise, of each terminal 51*g*3, a first end is electrically coupled to a corresponding terminal 51*f*3 via a wire (not illustrated) formed on the circuit board 51, and a second end is coupled to corresponding terminals (not illustrated) of the third B-to-B connector 52*d*3 on the relay board 52**.

The second B-to-B connector **51*d*2 includes: a terminal array Lg2 formed of a plurality of terminals 51*g*2; and a terminal array Lg4 formed of a plurality of terminals 51*g*4. In plan view, the terminal array Lg2 is formed on the direction X2 side of the second B-to-B connector 51*d*2, whereas the terminal array Lg4 is formed on the direction X1 side of the second B-to-B connector 51*d*2. Of each terminal 51*g*2, a first end is electrically coupled to a corresponding terminal 51*f*2 via a wire (not illustrated) formed on the circuit board 51, and a second end is coupled to a corresponding terminal (not illustrated) of the fourth B-to-B connector 52*d*4 on the relay board 52. Likewise, of each terminal 51*g*4, a first end is electrically coupled to a corresponding terminal 51*f*4 via a wire (not illustrated) formed on the circuit board 51, and a second end is coupled to a corresponding terminal (not illustrated) of the fourth B-to-B connector 52*d*4 on the relay board 52**.

The lengths of the terminal arrays Lf1, Lf2, Lf3, and Lf4 in one direction along the Y-axis are substantially the same as one another and defined as a length dy1. The lengths of the terminal arrays Lg1, Lg2, Lg3, and Lg4 in one direction along the Y-axis are substantially the same as one another and defined as a length dy2.

The description will be continued with reference to FIG. 3 again. The channel structure 53 is used to individually supply the ink stored in the liquid storage 10 to the head chips 54. The channel structure 53 is disposed between the circuit board 51 and the head chips 54. The channel structure 53 includes a channel member **53*a*, four first channel joints 53*b*, four second channel joints 53*c*, and four apertures 53*d*. The first channel joints 53*b* are disposed apart from the second channel joints 53*c* in one direction along the Y-axis. One direction along the Y-axis is an example of a direction orthogonal to the first direction. The first channel joints 53*b* and the second channel joints 53*c* are an example of a plurality of channel joints. Further, the first channel joints 53*b* are an example of a plurality of first channel joints; the second channel joints 53*c*** are an example of a plurality of second channel joints.

Each first channel joint **53*b* may be a supply pipe through which the ink is to be supplied to a corresponding head chip 54. The first channel joints 53*b* are coupled to the liquid storage 10 so as to be supplied with different types of ink. Each second channel joint 53*c* may be an ejection pipe that is coupled to an ejection container to which the ink is to be discharged at a predetermined timing during the initial filling of the ink in the liquid ejecting head 50 or that is coupled to a sub-tank that retains the ink and is disposed between the liquid storage 10 and the liquid ejecting head 50. Each second channel joint 53*c* is covered with a cap or other covering body in a normal state such as during a print operation. When the liquid storage 10 is coupled to the liquid ejecting head 50 via a recycling mechanism, each second channel joint 53*c*** is normally coupled to an ink recycling channel of the recycling mechanism.

The channel member **53*a* includes: four supply channels (not illustrated) for different types of ink, which communicate with the respective first channel joints 53*b*; and four ejection channels (not illustrated) for the types of ink, which communicate with the respective second channel joints 53*c*. The inlets of the supply and ejection channels are formed on the surface of the channel member 53*a*** which faces in the direction Z2.

The channel member **53*a*** may be a layered body in which a plurality of boards (not illustrated) are stacked together in one direction along the Z-axis. It should be noted that the expression "components A and B are stacked together" described herein does not necessarily have to mean the configuration in which components A and B are in direct contact with each other. For example, the expression "components A and B are stacked together" conceptionally implies the configuration in which the components A and B are stacked together with a component C therebetween. In addition, the expression "a component B is formed on a surface of a component A" does not necessarily have to mean the configuration in which components A and B are in direct contact with each other. For example, the expression "a component B is formed on a surface of a component A"

conceptionally implies the configuration in which a component C is formed on the surface of the component A and the component B is formed on a surface of the component C as long as the components A and B overlap in plan view.

Each of boards stacked is provided with grooves and holes, which are formed as appropriate for the supply and ejection channels. The boards may be stacked together with bonding, brazing, welding, or screwing. Hereinafter, the boards are bonded to one another with glue. In this case, for example, the glue is applied to the boards, which are then pressed against one another until the glue has been cured. Optionally, planar sealing members made of a rubber material are interposed between the boards. The number, thickness, and other physical properties of the boards constituting the channel member 53*a* may be determined as appropriate, in consideration of the shape, structure, and other aspects of the supply and ejection channels.

The channel structure 53 is also used to accommodate and support the head chips 54. The channel member 53*a* has a recess 53*e* depressed in the direction Z1, a plurality of screw holes 53*i*, and a plurality of screw holes 53*k*. The recess 53*e* provides a space in which the head chips 54 are disposed; the screw holes 53*i* are used to fix the channel structure 53 to the support body 41 (see FIG. 2) with the screws; and the screw holes 53*k* are used to fix the channel structure 53 to the cover 58 with the screws.

The relay board 52 is a rigid board having wires via which the head chips 54 are electrically coupled to the connector 52*b*. The relay board 52 may be a planar member widened in substantially parallel to the X-Y plane, and a thickness direction of the relay board 52 may be identical to a direction along the Z-axis. The outer shape may be rectangular or substantially rectangular in plan view. Of the relay board 52, a surface 52S1 that faces in the direction Z1 is provided with a connector 52*b*, and a surface 52S2 that faces in the direction Z2 is provided with two B-to-B connectors 52*d*, which are elongated along the Y-axis. The relay board 52 is provided with the third B-to-B connector 52*d*3 and the fourth B-to-B connector 52*d*4 as the B-to-B connector 52*d*. The third B-to-B connector 52*d*3 mates with the first B-to-B connector 51*d*1 so that the third B-to-B connector 52*d*3 is coupled to the first B-to-B connector 51*d*1. Likewise, the fourth B-to-B connector 52*d*4 mates with the second B-to-B connector 51*d*2 so that the fourth B-to-B connector 52*d*4 is coupled to the second B-to-B connector 51*d*2. The third B-to-B connector 52*d*3 is an example of a third board-to-board connector; the fourth B-to-B connector 52*d*4 is an example of a fourth board-to-board connector.

The connector 52*b* is a connecting component used to electrically couple the liquid ejecting head 50 to the control unit 20. The connector 52*b* is electrically coupled to both the third B-to-B connector 52*d*3 and the fourth B-to-B connector 52*d*4. The connector 52*b* may be a B-to-B connector or other type of connector. The connector 52*b* is electrically coupled to a wiring member 59 (see FIG. 2) via which various signals, such as the control signal S and the drive signal D, are to be transmitted from the control unit 20 to the liquid ejecting head 50. The wiring member 59 includes a flexible board 60, a rigid board 61, a connector 61*a*, and a connector 61*b*. The flexible board 60, made of a flexible printed circuit (FPC) or a flexible flat cable (FFC), is directly or indirectly coupled to the control unit 20; the connector 61*a* is coupled to a first side of the rigid board 61; and the connector 61*b*, made of a B-to-B connector, is formed on a second side of the rigid board 61. The flexible board 60 is coupled to the connector 61*a*; the connector 61*b* is coupled to the connector 52*b*. The wiring member 59 is an example of an external wiring member. The connector 52*b* does not necessarily have to be a B-to-B connector as described above. Alternatively, the connector 52*b* may be a connector into which the flexible board 60 coupled to the control unit 20 is to be directly inserted or may be a connector to be coupled to a connector formed on one of the sides of the flexible board 60 which is closer to the liquid ejecting head 50.

Each head chip 54, which discharges the ink, includes: a first group of nozzles N through which a first ink is to be discharged; and a second group of nozzles N through which a second ink is to be discharged; the first ink is different in type from the second ink. The first ink and the second ink may be two out of the four types of ink described above. For example, the head chip 54_1 and the head chip 54_2 may use two out of the four types of ink, as the first ink and the second ink. In addition, the head chip 54_3 and the head chip 54_4 may use the remaining types of ink, as the first ink and the second ink. It should be noted that, although FIG. 3 only illustrates the schematic configuration of each head chip 54, a detailed configuration thereof will be described with reference to FIG. 5.

The fixing plate 55 is a planar member to which the head chips 54 and the channel structure 53 are fixed. More specifically, the head chips 54 and the channel structure 53 are fixed to the fixing plate 55 with glue, for example, while the head chips 54 are disposed between the fixing plate 55 and the channel structure 53. All the head chips 54, which are fixed to the fixing plate 55, are disposed at a substantially identical location in one direction along the Z-axis. The fixing plate 55 is provided with a plurality of apertures 55*a* through which nozzle surfaces FN (see FIG. 5) of the head chips 54 are exposed to the outside. As in the example of FIG. 3, the apertures 55*a* may be formed for the respective head chips 54. The fixing plate 55 may be made of a metal material, such as stainless steel, titanium, and a magnesium alloy.

The cover 58 is a box-shaped member that overlays the relay board 52. The cover 58 may be made of a resin material, such as modified polyphenylene ether resin, polyphenylene sulfide resin, or polypropylene resin.

The cover 58 includes an aperture section 58*a*, four through-holes 58*b*, and four through-holes 58*c*. The aperture section 58*a* allows the connector 52*b* to pass therethrough in the direction from the inner to outer side of the cover 58. The through-holes 58*b* are formed for the respective first channel joints 53*b* and allow the first channel joints 53*b* to pass therethrough. Likewise, the through-holes 58*c* are formed for the respective second channel joints 53*c* and allow the second channel joints 53*c* to pass therethrough.

1-4. Configuration of Head Chips

Figure 5:
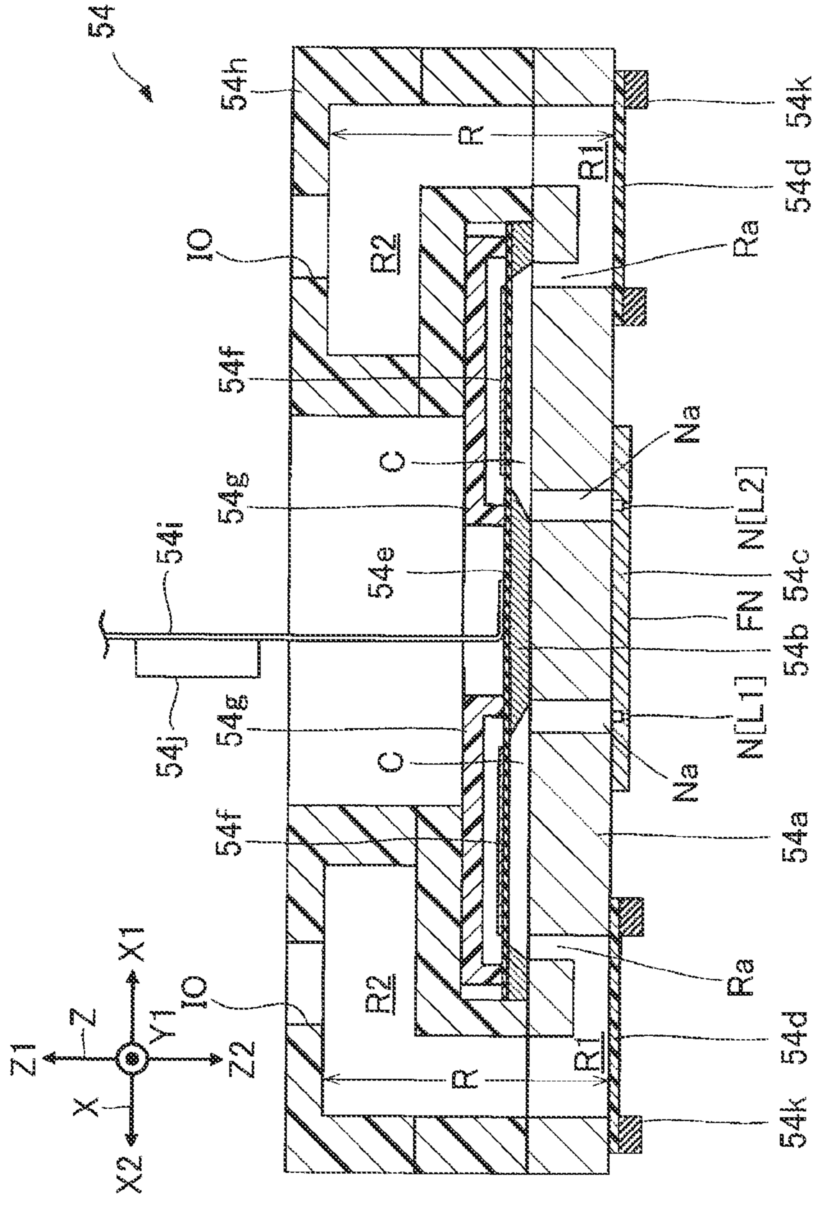
FIG. 5 is a cross-sectional view of an example of one of the head chips.

FIG. 5 is a cross-sectional view of a head chip 54, which is an example of one of the head chips 54_1 to 54_4. Each head chip 54 includes a plurality of nozzles N arrayed in one direction along the Y-axis, thereby forming a first array L1 and a second array L2 spaced in one direction along the X-axis. Each of the first array L1 and the second array L2 is formed of a group of nozzles N arrayed in one direction along the Y-axis.

The configuration of the head chip 54 is substantially symmetric with respect to the center in one direction along the X-axis. As in the example of FIG. 5, the nozzles N of the first array L1 may be aligned with the corresponding nozzles N of the second array L2 in one direction along the Y-axis. However, they do not necessarily have to be aligned. Alternatively, the nozzles N of the first array L1 may be misaligned from the nozzles N of the second array L2 in one direction along the Y-axis.

As illustrated in FIG. 5, the head chip 54 includes a communicating plate 54*a*, a chamber board 54*b*, a nozzle plate 54*c*, a vibration absorbing body 54*d*, a vibration plate 54*e*, a plurality of piezoelectric elements 54*f*, a protective board 54*g*, a case 54*h*, a wiring member 54*i*, and a driver circuit 54*j*.

The chamber board 54*b* is stacked on the surface of the communicating plate 54*a* in the direction Z1 to form channels along which the ink is to be supplied to the nozzles N. In the space created on the direction Z1 side of the stacked body formed of both the communicating plate 54*a* and the chamber board 54*b*, the vibration plate 54*e*, the piezoelectric elements 54*f*, the protective boards 54*g*, the case 54*h*, the wiring member 54*i*, and the driver circuit 54*j* are disposed. In the space created on the direction Z2 side of the layered body, the nozzle plate 54*c* and the vibration absorbing body 54*d* are disposed. The components of the head chip 54, each of which is a substantially planar member elongated in one direction along the Y-axis, are bonded to one another with glue, for example. The components of the head chip 54 will be described below in sequence.

The nozzle plate 54*c* is a planar member provided with the nozzles N of the first array L1 and the second array L2 and is widened in substantially parallel to the X-Y plane. Each nozzle N is a through-hole that allows the ink to pass therethrough. The surface of the nozzle plate 54*c* in the direction Z2 corresponds to the nozzle surface FN. The direction normal to the nozzle surface FN is identical to the direction of the vector normal to the nozzle surface FN and the discharge direction, or the direction Z2. The nozzle plate 54*c* may be manufactured by subjecting a monocrystalline silicon substrate to a known semiconductor fabrication process, such as dry or wet etching. However, the nozzle plate 54*c* may be manufactured as appropriate by subjecting another known material to another known process. The cross-section of each nozzle may have a circular shape; however, it may also have a noncircular shape such as a polygonal or oval shape.

The communicating plate 54*a* provides a space R1, a plurality of supply channels Ra, and a plurality of communicating channels Na in relation to each of the first array L1 and the second array L2. The space R1 is an aperture elongated in one direction along the Y-axis as viewed in one direction along the Z-axis, namely, in plan view. The supply channels Ra are through-holes formed for the respective nozzles N. Likewise, the communicating channels Na are through-holes formed for the respective nozzles N. Each supply channel Ra communicates with the corresponding space R1.

The chamber board 54*b* is a planar member that provides a plurality of chambers C, also referred to as cavities, in relation to each of the first arrays L1 and the second arrays L2. The chambers C are arrayed in one direction along the Y-axis. Each of the chambers C, which is formed for a corresponding one of the nozzles N, is a space elongated in one direction along the X-axis in plan view. Similar to the nozzle plate 54*c* described above, each of the communicating plates 54*a* and the chamber boards 54*b* may also be manufactured by subjecting a monocrystalline silicon substrate to a known semiconductor fabrication process. However, each of the communicating plates 54*a* and the chamber boards 54*b* may be manufactured as appropriate by subjecting another known material to another known process.

Each chamber C is a space created between the communicating plate 54*a* and the vibration plate 54*e*. The chambers C are arrayed in one direction along the Y-axis in relation to each of the first array L1 and the second array L2. The chambers C communicate with the respective pairs of the communicating channel Na and the supply channel Ra. Thus, the chambers C communicate with the nozzles N through the communicating channels Na and also communicate with the spaces R1 through the supply channels Ra.

The vibration plate 54*e* is mounted on the surface of the chamber board 54*b* which faces in the direction Z1. The vibration plate 54*e*, which is a planar member that can elastically vibrate, may include a first layer and a second layer stacked in this order in the direction Z1. The first layer may be an elastic film formed of oxide silicon ($SiO_2$), which is formed by, for example, thermally oxidizing a surface of a monocrystalline silicon substrate. The second layer may be a dielectric film formed of zirconium oxide ($ZrO_2$), which is formed by, for example, forming a zirconium layer with sputtering and then thermally oxidizing the surface of the resultant layer. However, the configuration of the vibration plate 54*e* is not limited to this stacked configuration with the first and second layers. Alternatively, the vibration plate 54*e* may be formed of a single layer or three or more layers.

The piezoelectric elements 54*f* are arranged as drive elements on the surface of the vibration plate 54*e* which faces in the direction Z1 in relation to the nozzles N in each of the first array L1 and the second array L2. Each piezoelectric element 54*f* may be a passive element that deforms in response to the supply of the drive signal D and may be elongated in one direction along the X-axis in plan view. The piezoelectric elements 54*f* are arrayed in one direction along the Y-axis in relation to the respective chambers C. Further, the piezoelectric elements 54*f* are disposed so as to overlap the respective chambers C in plan view.

Each piezoelectric element 54*f* includes a first electrode, a piezoelectric layer, and a second electrode (not illustrated), which are stacked in this order in the direction Z1. One of the first electrode and the second electrode may be one of a plurality of electrodes arranged apart from one another in the respective piezoelectric elements 54*f*; these electrodes receive respective drive signals D. The other of the first electrode and the second electrode may be a common electrode formed over the piezoelectric elements 54*f* so as to extend in one direction along the Y-axis; these electrodes are kept at a predetermined voltage potential. Each of the first and second electrodes may be made of a metal material, examples of which include platinum (Pt), aluminum (Al), nickel (Ni), gold (Au), copper (Cu), and an alloy or layer formed of two or more thereof. The piezoelectric layer may be made of a piezoelectric material such as lead zirconate titanate ($Pb(Zr,Ti)O_3$) and formed over the piezoelectric elements 54*f* so as to extend in one direction along the Y-axis. Optionally, the piezoelectric layer is formed integrally with the piezoelectric elements 54*f*, in which case through-holes are formed across the piezoelectric layer and within regions between the adjacent chambers C in plan view so as to extend in one direction along the X-axis. In response to the deformations of the piezoelectric elements 54*f* configured above, the vibration plate 54*e* vibrates to vary the inner pressures of the chambers C, thereby discharging the ink to the outside through the nozzles N. Instead of the piezoelectric elements 54*f*, heater elements that head the ink within the chambers C may be used as the drive elements.

The protective board 54*g* is a planar member disposed over the surface of the vibration plate 54*e* in the direction Z1. The protective board 54*g* is used to protect the piezoelectric elements 54*f* and increase the mechanical strength of the vibration plate 54*e*. The protective board 54*g*, which may be made of a resin material, creates a space over the vibration plate 54*e*, in which the piezoelectric elements 54*f* are arranged.

The case 54*h*, which may be made of a resin material, is a casing that stores the ink to be supplied to the chambers C. The case 54*h* provides a space R2 in relation to each of the first array L1 and the second array L2. The space R2 communicates with a corresponding space R1 described above to function as a reservoir R that stores the ink to be supplied to a corresponding chamber C. The case 54*h* is provided with inlets IO through which the ink is to be supplied to the respective reservoirs R. The ink stored in the reservoirs R is supplied to the chambers C through the respective supply channels Ra.

The vibration absorbing body 54*d*, also referred to as the compliance board, is a flexible resin film that forms the walls of the reservoirs R and absorbs fluctuations in the ink pressures within the reservoirs R. The protective board 54*g* may be a thin flexible metal plate. Of the vibration absorbing body 54*d*, the surface facing in the direction Z1 is bonded to the communicating plate 54*a* with glue, for example, and the surface facing in the direction Z2 is bonded to a frame body 54*k* with glue, for example. The frame body 54*k* is a frame member formed on the outer circumference of the vibration absorbing body 54*d*. The frame body 54*k* is in contact with the fixing plate 55 described above. The frame body 54*k* may be made of a metal material, such as stainless steel, aluminum, titanium, or a magnesium alloy The wiring member 54*i*, which is mounted on the surface of the vibration plate 54*e* in the direction Z1, is a flexible board used to electrically couple each head chip 54 to the control unit 20. The wiring member 54*i*, which may be a flexible circuit board such as a chip on film (COF), a flexible flat cable (FPC), or a flexible printed circuit (FFC), is electrically coupled to each piezoelectric element 54*f*. In this embodiment, the driver circuit 54*j* that applies a drive voltage to each piezoelectric element 54*f* is mounted on the wiring member 54*i*. The driver circuit 54*j* selectively supplies at least a portion of a waveform contained in the drive signal D as a drive pulse, based on the control signal S. The wiring member 54*i* is disposed in each head chip 54.

The head chip 54_1 has a wiring member 54*i*_1, which is an example of a first flexible board; the head chip 54_2 has a wiring member 54*i*_2, which is an example of a second flexible board; the head chip 54_3 has a wiring member 54*i*_3, which is an example of a third flexible board; and the head chip 54_4 has a wiring member 54*i*_4, which is an example of a fourth flexible board.

1-5. Positional Relationship Between Circuit Board, Relay Board, and Head Chips

Figure 6:
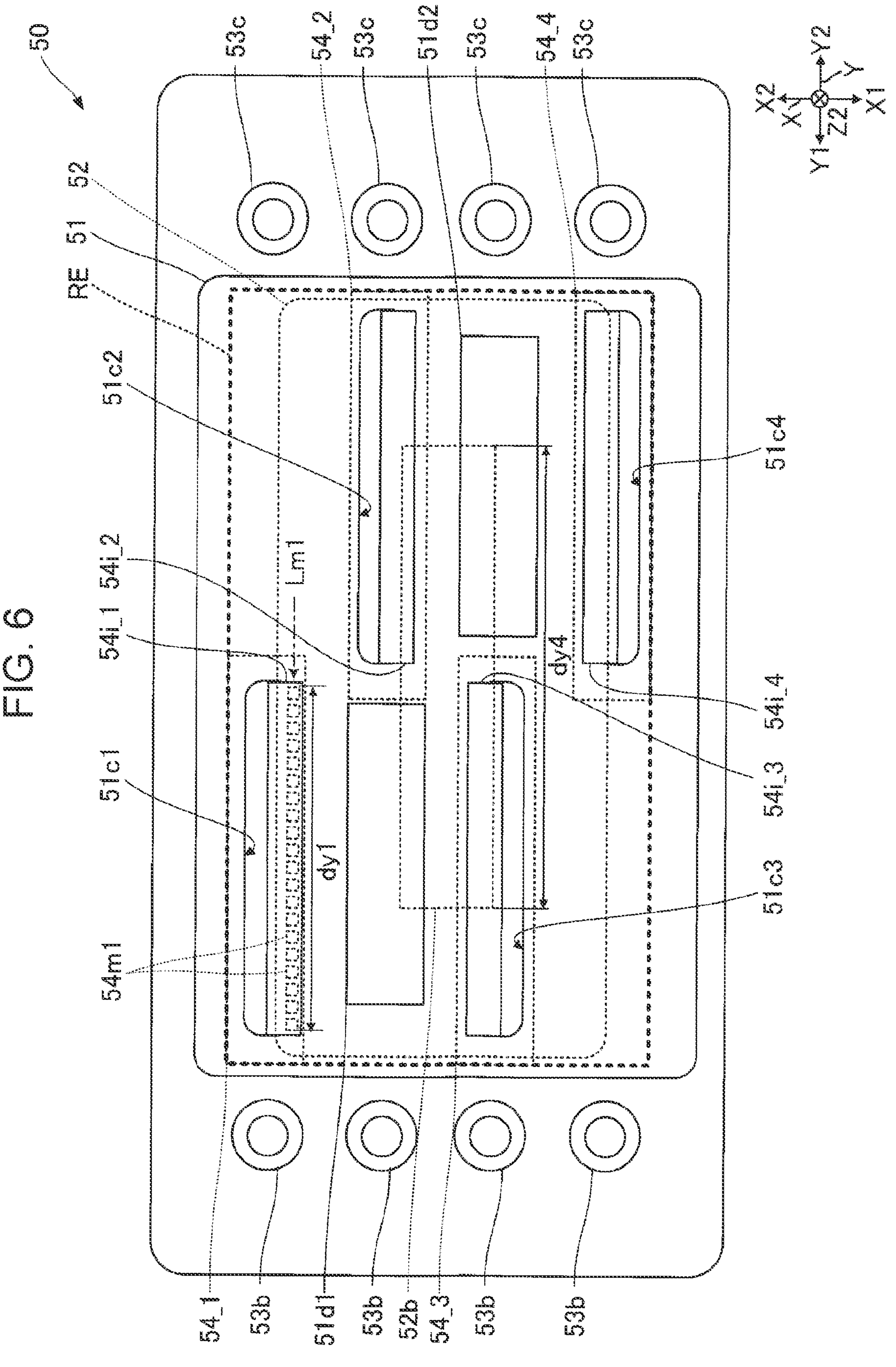
FIG. 6 is a plan view of the liquid ejecting head.

The positional relationship between the circuit board 51, the relay board 52, and the head chips 54 will be described below with reference to FIG. 6. FIG. 6 is a plan view of the liquid ejecting head 50. It should be noted that, in FIG. 6, the cover 58 is not depicted and the relay board 52 and the head chips 54_1 to 54_4 are depicted only by their outlines, for the purpose of clarifying the positional relationship between the circuit board 51, the relay board 52, and the head chips 54. The outlines of the head chips 54_1 to 54_4 correspond to those of the cases 54*h* of the head chips 54_1 to 54_4.

As illustrated in FIG. 6, the relay board 52 is smaller than the circuit board 51 as viewed in the direction Z2. Furthermore, each of the first B-to-B connector 51*d*1 and the second B-to-B connector 51*d*2 is disposed within a rectangle RE, which is the smallest rectangle that encompasses all the head chips 54_1 to 54_4 as viewed in the direction Z2. Moreover, the relay board 52 overlays or overlaps one or more of the wiring members 54*i* of the head chips 54_1 to 54_4 as viewed in the direction Z2. The expression "a first object overlaps a second object" means that a portion of the first object overlays the second object or that the first object overlays a portion of the second object. More specifically, the relay board 52 overlays both the wiring members 54*i*_2 and 54*i*_3 and overlaps both the wiring members 54*i*_1 and 54*i*_4, as viewed in the direction Z2.

The wiring member 54*i*_1 passes through the aperture 51*c*1 and is coupled to the terminals 51*f*1. Likewise, the wiring member 54*i*_2 passes through the aperture 51*c*2 and is coupled to the terminals 51*f*2; the wiring member 54*i*_3 passes through the aperture 51*c*3 and is coupled to the terminals 51*f*3; and the wiring member 54*i*_4 passes through the aperture 51*c*4 and is coupled to the terminals 51*f*4. The head chip 54_1 is an example of a first one of the head chips disposed adjacent to each other with a first board-to-board connector therebetween, whereas the head chip 54_3 is an example of a second one of the head chips disposed adjacent to each other with the first board-to-board connector therebetween. The terminals 51*f*1 are an example of a plurality of first terminals; the terminals 51*f*3 are an example of a plurality of second terminals. The aperture 51*c*1 is an example of a first aperture; the aperture 51*c*3 is an example of a second aperture.

The first B-to-B connector 51*d*1 is electrically coupled to both the wiring members 54*i*_1 and 54*i*_3 and disposed between the wiring members 54*i*_1 and 54*i*_3, whereas the second B-to-B connector 51*d*2 is electrically coupled to both the wiring members 54*i*_2 and 54*i*_4 and disposed between the wiring members 54*i*_2 and 54*i*_4. FIG. 6 does not illustrate the B-to-B connectors 52*d* for the sake of simplification; however, the third B-to-B connector 52*d*3 is also disposed between the wiring members 54*i*_1 and 54*i*_3 in plan view because the third B-to-B connector 52*d*3 mates with the first B-to-B connector 51*d*1. Likewise, the fourth B-to-B connector 52*d*4 is also disposed between the wiring members 54*i*_2 and 54*i*_4.

The apertures 51*c*1, 51*c*2, 51*c*3, and 51*c*4 are disposed in this order in the direction X1. In accordance with this arrangement of the apertures 51*c*, the head chips 54_1, 54_2, 54_3, and 54_4 are also disposed in this order in the direction X1. Since the apertures 51*c*1 and 51*c*3 are arranged at a substantially identical location in one direction along the Y-axis, the head chips 54_1 and 54_3 are also arranged at a substantially identical location in one direction along the Y-axis. Since the apertures 51*c*2 and 51*c*4 are arranged at a substantially identical location in one direction along the Y-axis, the head chips 54_2 and 54_4 are also arranged at a substantially identical location in one direction along the Y-axis. The head chips 54_1 and 54_2 are shifted from each other along the Y-axis so that the head chips 54_1 and 54_2 overlap each other as viewed in one direction along the X-axis. Likewise, the head chips 54_3 and 54_4 are shifted from each other along the Y-axis so that the head chips 54_3 and 54_4 overlap each other as viewed in one direction along the X-axis. In short, the head chips 54_1 to 54_4 are arranged in a staggered fashion.

The wiring member 54*i*_1 has a terminal array Lm1, which is coupled to the circuit board 51 and formed of a plurality of terminals 54*m*1 arrayed along the Y-axis. The length of the terminal array Lm1 along the Y-axis is equal to that of the terminal array Lf1 along the Y-axis and thus denoted by dy1. As can be seen from FIGS. 4 and 6, the length dy1 of the terminal array Lg2 along the Y-axis is shorter than the length dy1 of the terminal array Lm1 along the Y-axis. The wiring member 54*i*_1 is an example of a flexible board mounted on one of a plurality of head chips; each of the directions Y1 and Y2 along the Y-axis is an example of a fourth direction; the terminals 54*m*1 are an example of a plurality of third terminals; the terminal array Lm1 is an example of a first terminal array; the terminals 51*g*1 are an example of a plurality of fourth terminals; and the terminal array Lg1 is an example of the second terminal array.

As illustrated in FIG. 6, the connector 52*b* overlaps both the first B-to-B connector 51*d*1 and the second B-to-B connector 51*d*2 as viewed in the direction Z2. A length dy4 of the connector 52*b* along the Y-axis is longer than a length dy3, illustrated in FIG. 4, of the first B-to-B connector 51*d*1 along the Y-axis.

1-6. Conclusions of First Embodiment

According to a first embodiment of the present disclosure, a liquid ejecting head 50 includes: a plurality of head chips 54_1 to 54_4 that discharge ink in a direction Z2; a circuit board 51 that is a rigid board coupled to a plurality of wiring members 54*i* mounted on the respective head chips 54_1 to 54_4; and a relay board 52 that is disposed opposite the head chips 54_1 to 54_4 with the circuit board 51 therebetween and that is a rigid board provided with a connector 52*b* to be coupled to an external wiring member. The circuit board 51 has a first B-to-B connector 51*d*1 coupled to the relay board 52 and a second B-to-B connector 51*d*2 coupled to the relay board 52. The relay board 52 has a third B-to-B connector 52*d*3 coupled to the circuit board 51 and a fourth B-to-B connector 52*d*4 coupled to the circuit board 51. The first B-to-B connector 51*d*1 mates with the third B-to-B connector 52*d*3 so that the first B-to-B connector 51*d*1 is coupled to the third B-to-B connector 52*d*3; the second B-to-B connector 51*d*2 mates with the fourth B-to-B connector 52*d*4 so that the second B-to-B connector 51*d*2 is coupled to the fourth B-to-B connector 52*d*4. The connector 52*b* is electrically coupled to both the third B-to-B connector 52*d*3 and the fourth B-to-B connector 52*d*4.

In a liquid ejecting head 50 according to the first embodiment, two B-to-B connectors 52*d* are combined by a relay board 52 into a connector 52*b*. This configuration enables the liquid ejecting head 50 to be coupled to an external wiring member via a small number of connectors. In addition, using the two B-to-B connectors 52*d* and the two B-to-B connectors 51*d* enables both the circuit board 51 and the relay board 52 to be retained in substantially parallel to the X-Y plane. With the first embodiment, the liquid ejecting head 50 can be downsized in one direction along the Z-axis in comparison with another liquid ejecting head in which a relay board 52 is retained vertically to a circuit board 51.

By mating the first B-to-B connector 51*d*1 and the second B-to-B connector 51*d*2 on the circuit board 51, respectively, with the third B-to-B connector 52*d*3 and the fourth B-to-B connector 52*d*4 on a relay board 52 in such a way that the relay board 52 is pushed against the circuit board 51 in a direction Z2, the relay board 52 are coupled to the circuit board 51. With this configuration, the liquid ejecting head 50 can be assembled easily in comparison with another liquid ejecting head in which a relay board 52 is coupled to a circuit board 51 via a flexible board. Moreover, since the circuit board 51 can support the relay board 52 with the mating structure of the B-to-B connectors, the liquid ejecting head 50 requires no dedicated support structures, which leads to a simplified configuration of the liquid ejecting head 50.

The relay board 52 may be smaller than the circuit board 51 as viewed in the direction Z2. With the first embodiment, the liquid ejecting head 50 can be downsized in one direction along the Z-axis in comparison with another liquid ejecting head in which a relay board 52 is larger than a circuit board 51.

Both the first B-to-B connector 51*d*1 and the second B-to-B connector 51*d*2 may be disposed inside a smallest rectangle RE that encompasses all the head chips 54_1 to 54_4, as viewed in the direction Z2. If at least a portion of a first B-to-B connector 51*d*1 or a second B-to-B connector 51*d*2 is disposed outside the rectangle RE, a liquid ejecting head 50 may be upsized in a direction vertical to the Z-axis due to this portion. With the first embodiment, however, the liquid ejecting head 50 can be downsized in the direction vertical to the Z-axis in comparison with another liquid ejecting head in which a first B-to-B connector 51*d*1 or a second B-to-B connector 51*d*2 is at least partly disposed outside the rectangle RE as viewed in the direction Z2.

The relay board 52 may overlap or overlay one or more of the plurality of wiring members 54*i* as viewed in the direction Z2. If a relay board 52 does not overlap any of the wiring members 54*i* as viewed in the direction Z2, the liquid ejecting head 50 may be upsized in a direction vertical to the Z-axis due to this nonoverlapping wiring member 54*i*. With the first embodiment, however, the liquid ejecting head 50 can be downsized in the direction vertical to the Z-axis in comparison with another liquid ejecting head in which the relay board 52 does not overlap one or more wiring member 54*i* as viewed in the direction Z2.

The liquid ejecting head 50 may further include a channel structure 53 through which the liquid is supplied to the head chips 54_1 to 54_4. The channel structure 53 may be disposed between the circuit board 51 and the head chips 54_1 to 54_4. The channel structure 53 may have a plurality of apertures 53*d* through which the respective wiring members 54*i* pass. With the first embodiment, the wiring members 54*i* can be coupled to the circuit board 51 by passing the wiring members 54*i*, each formed of a flexible board, through the apertures 51*c*. It is thus unnecessary to excessively route the wiring members 54*i*.

The channel structure 53 may have a plurality of channel joints to be coupled to an external channel member. The plurality of channel joints may include a first channel joint 53*b* and a second channel joint 53*c* disposed apart from each other in a direction orthogonal to the direction Z2. The circuit board 51 may be disposed between the first channel joint 53*b* and the second channel joint 53*c* in the direction orthogonal to the direction Z2.

The head chips 54_1 to 54_4 may include a head chip 54_1 and a head chip 54_3 disposed adjacent to each other with the first B-to-B connector 51*d*1 therebetween as viewed in the direction Z2. The circuit board 51 may include an aperture 51*c*1 through which the wiring member 54*i* of the head chip 54_1 passes, an aperture 51*c*3 through which the wiring member 54*i* of the head chip 54_3 passes, a plurality of first terminals 51*f*1 formed between the first board-to-board connector 51*d*1 and the first aperture 51*c*1, and a plurality of second terminals 51*f*3 formed between the first board-to-board connector 51*d*1 and the aperture 51*c*3. The wiring member 54*i* 1 of the head chip 54_1 may be coupled to the plurality of first terminals 51*f*1, and the wiring member 54*i* 3 of the head chip 54_3 may be coupled to the plurality of second terminals 51*f*3.

With the first embodiment, the distance between the first B-to-B connector 51*d*1 and each terminal 51*f*1 can be shortened in comparison with another configuration in which a plurality of terminals 51*f*1 are not formed between a first B-to-B connector 51*d*1 and an aperture 51*c*1. Therefore, the configuration in the first embodiment contributes to downsizing of the circuit board 51 in the direction vertical to the Z-axis because it is possible to couple the plurality of terminals **51*f*1 to the first B-to-B connector 51*d*1 on the circuit board 51** via short wires.

The plurality of head chips may include a head chip 54_1, a head chip 54_2, a head chip 54_3, and a head chip 54_4. The head chip 54_1 may have a wiring member **54*i*_1; the head chip 54_2 may have a wiring member 54*i*_2; the head chip 54_3 may have a wiring member 54*i*_3; and the head chip 54_4 may have a wiring member 54*i*_4. The head chips 54_1, 54_2, 54_3, and 54_4 may be disposed in this order in the direction X1. The head chips 54_1 and 54_3 may be disposed in a substantially identical location in one direction along the Y-axis; the head chips 54_2 and 54_4 may be disposed in a substantially identical location in one direction along the Y-axis. The head chip 54_1 may be shifted from the head chip 54_2 in one direction along the Y-axis so that the head chip 54_1 overlaps the head chip 54_2 as viewed in one direction along the X-axis. The first B-to-B connector 51*d*1 may be electrically coupled to both the wiring member 54*i*_1 and the wiring member 54*i*_3 and disposed between the wiring member 54*i*_1 and the wiring member 54*i*_3. The second B-to-B connector 51*d*2 may be electrically coupled to both the wiring member 54*i*_2 and the wiring member 54*i*_4 and disposed between the wiring member 54*i*_2 and the wiring member 54*i*_4**.

The first embodiment efficiently utilizes empty regions to contribute to downsizing of the liquid ejecting head 50 in a direction vertical to the Z-axis. This configuration allows the two B-to-B connectors **51*d* to be disposed within respective empty regions that are defined by the head chips 54_1 to 54_4 arranged in a staggered fashion, more specifically, to be disposed between the wiring members 54*i*_1 and 54*i*_3 and the wiring members 54*i*_2 and 54*i*_4**.

The connector **52*b* may overlap both the first B-to-B connector 51*d*1 and the second B-to-B connector 51*d*2 as viewed in the direction Z2. The first embodiment contributes to downsizing of the relay board 52 in comparison with another configuration in which the connector 52*b* does not overlap the first B-to-B connector 51*d*1 or the second B-to-B connector 51*d*2**.

The wiring member **54*i*_1 may be coupled to the circuit board 51 and may have a terminal array Lm1 formed of a plurality of terminals 54*m*1 arranged along the Y-axis. The first B-to-B connector 51*d*1 may be coupled to the circuit board 51 and may have a terminal array Lg1 formed of a plurality of terminals 51g1 arranged along the Y-axis. As illustrated in FIGS. 4 and 6, a length dy2 of the terminal array Lg1 in one direction along the Y-axis may be shorter than a length dy1 of the terminal array Lm1** in one direction along the Y-axis.

With the first embodiment, both the first B-to-B connector **51*d*1 and the third B-to-B connector 52*d*3 are used to couple the circuit board 51 to the relay board 52. This configuration can shorten the length dy2 of the terminal array Lg1 in comparison with another configuration in which a circuit board 51 is coupled to a relay board 52 via a flexible board. This contributes to downsizing of the circuit board 51 in a direction vertical to the Z-axis. More specifically, as illustrated in FIG. 6, the head chip 54_1 may be shifted from the head chip 54_2 in one direction along the Y-axis so that the head chip 54_1 overlaps the head chip 54_2 as viewed in one direction along the X-axis. This configuration can shrink an empty region on the circuit board 51 in comparison with another configuration in which the head chip 54_1 does not overlap the head chip 54_2 as viewed in one direction along the X-axis. With the first embodiment, the first B-to-B connector 51*d*1 coupled to the relay board 52 can be disposed within a small region on the circuit board 51. This is because the length dy2 of the terminal array Lg1 in the first B-to-B connector 51*d*1 is shorter than the length dy1 of the terminal array Lm1 of the wiring member 54*i*_1**.

A length dy4 of the connector **52*b* in one direction along the Y-axis may be longer than a length dy3 of the first B-to-B connector 51*d*1** in one direction along the Y-axis.

Thickness directions of the circuit board 51 and the relay board 52 may correspond to one direction along the Z-axis, namely, may be substantially identical to each other. It can also be said that the thickness direction of the circuit board 51 and the relay board 52 is substantially parallel to a nozzle surface FN of a nozzle plate **54*c*. With the first embodiment, the circuit board 51 is stacked on and coupled to the relay board 52. This configuration can downsize the liquid ejecting head 50 in one direction along the Z-axis in comparison with another configuration in which a thickness direction of a circuit board 51 is nonidentical to a thickness direction of a relay board 52**.

A liquid ejecting apparatus 100 includes: the liquid ejecting head 50; and the external wiring member 59 that is disposed outside the liquid ejecting head 50 and that is coupled to the connector **52*b* of the liquid ejecting head 50. The first embodiment can provide a liquid ejecting apparatus 100 that has a liquid ejecting head 50 downsized in one direction along the Z-axis in comparison with another liquid ejecting head in which a relay board 52 is retained vertically to a circuit board 51**.

2. Modification

The foregoing first embodiment may be modified in various ways. Some concrete modifications will be described below. It should be noted that some of the modifications described below may be combined as appropriate unless they are inconsistent with each other.

2.1. First Modification

Although the head chips 54_1 to 54_4 are arranged in a staggered fashion in the first embodiment, they may be arranged in any other fashion.

Figure 7:
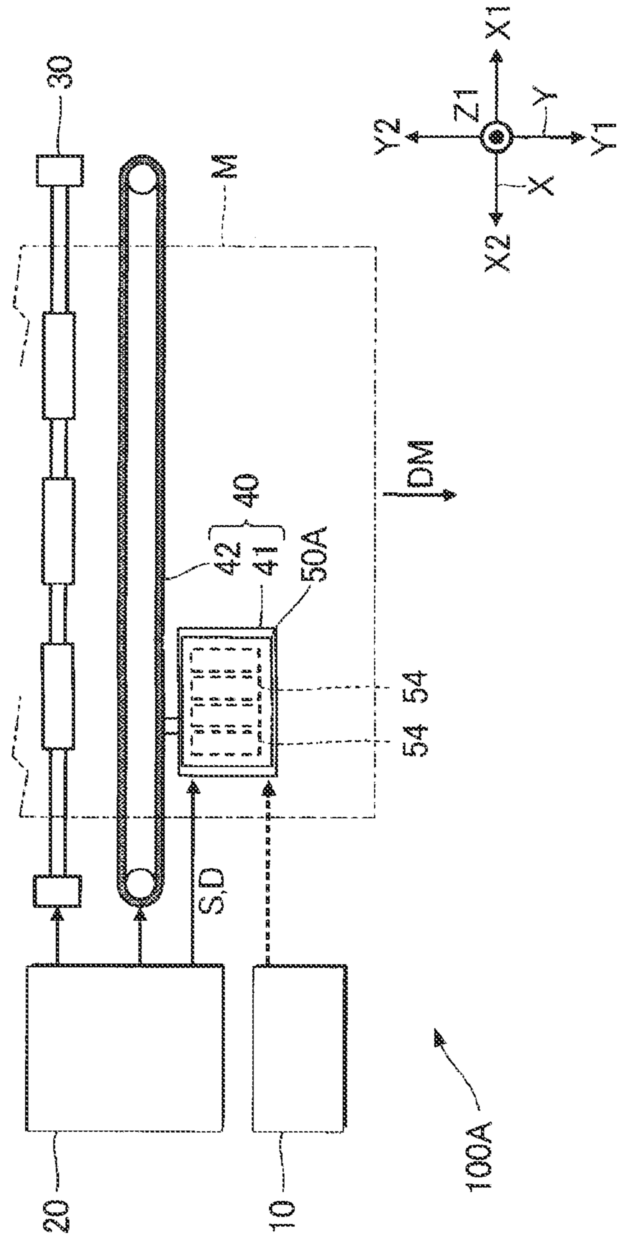
FIG. 7 is a schematic view of a liquid ejecting apparatus according to a first modification of the first embodiment.

FIG. 7 is a schematic view of a liquid ejecting apparatus 100A according to a first modification of the first embodiment. The liquid ejecting apparatus 100A differs from the liquid ejecting apparatus 100, in including a liquid ejecting head 50A instead of the liquid ejecting head 50. The liquid ejecting head 50A includes a plurality of head chips 54 arranged along the X-axis. Details of the liquid ejecting head 50A will be described below with reference to FIG. 8.

Figure 8:
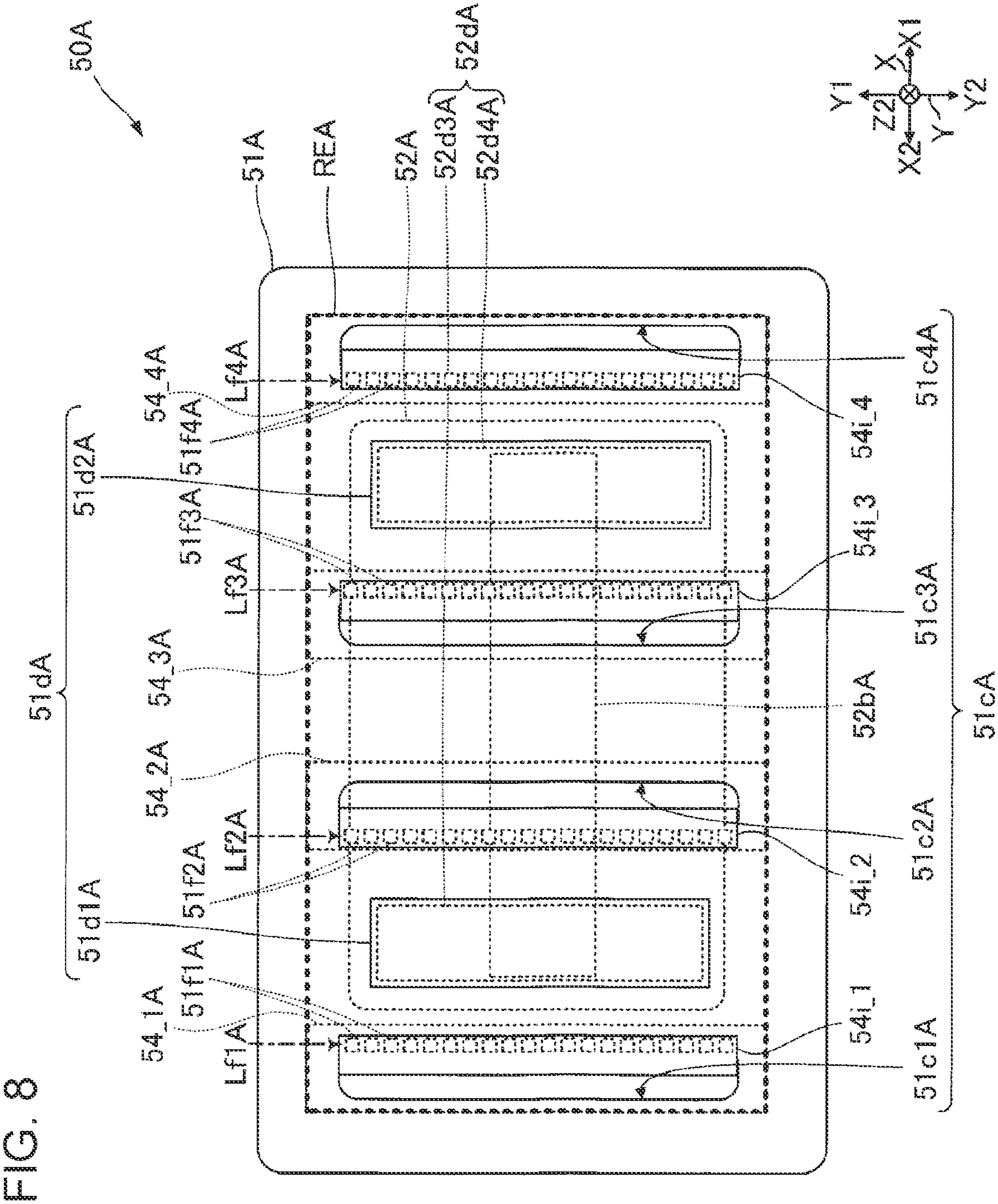
FIG. 8 is a plan view of the liquid ejecting head according to the first modification.

FIG. 8 is a plan view of the liquid ejecting head 50A. The liquid ejecting head 50A differs from the liquid ejecting head 50, in including a circuit board 51A instead of the circuit board 51, a relay board 52A instead of the relay board 52, and a plurality of head chips 54_1A to 54_4A instead of the head chips 54_1 to 54_4. It should be noted that, in FIG. 8, a cover 58 is not depicted and the relay board 52A and the head chips 54_1A to 54_4A are depicted only by their outlines, for the purpose of clarifying the positional relationship between the circuit board 51A, the relay board 52A, and the head chips 54_1A to 54_4A. The outlines of the head chips 54_1A to 54_4A correspond to those of cases **54*h* of the head chips 54_1A to 54_4**A.

The circuit board 51A differs from the circuit board 51, in including: four apertures **51*c*A instead of the apertures 51*c*; two B-to-B connectors 51*d*A instead of the B-to-B connectors 51*d*; a terminal array Lf1A instead of the terminal array Lf1; a terminal array Lf2A instead of the terminal array LF2; a terminal array Lf3A instead of the terminal array LF3; and a terminal array Lf4A instead of the terminal array LF4. The apertures 51***c*A differ from the apertures 51*c* in that the locations of the apertures 51*c*A formed on the circuit board 51A differ from those of the corresponding apertures 51*c* on the circuit board 51. The B-to-B connectors 51*d*A differ from the B-to-B connectors 51*d* in that the locations of the B-to-B connectors 51*d*A mounted on the circuit board 51A differ from those of the corresponding B-to-B connectors 51*d* on the circuit board 51. The head chips 54_1A to 54_4A differ from the head chips 54_1 to 54_4 in that the locations of the head chips 54_1A to 54_4 mounted on the circuit board 51A differ from those of the corresponding head chips 54_1 to 54_4 on the circuit board 51.

The circuit board 51A includes an aperture 51*c*1A, an aperture 51*c*2A, an aperture 51*c*3A, and an aperture 51*c*4A as the apertures 51*c*A. The apertures 51*c*1A, 51*c*2A, 51*c*3A, and 51*c*4A are disposed in this order in the X1 direction. In the first modification, one direction along the X-axis, or the direction X1 or X2, is an example of the second direction. All the apertures 51*c*A are arranged at a substantially identical location along the Y-axis. The aperture 51*c*1A allows a wiring member 54*i*_1 to pass therethrough; the aperture 51*c*2A allows a wiring member 54*i*_2 to pass therethrough; the aperture 51*c*3A allows a wiring member 54*i*_3 to pass therethrough; and the aperture 51*c*4A allows the wiring member 54*i*_4 to pass through.

The circuit board 51A includes a first B-to-B connector 51*d*1A and a second B-to-B connector 51*d*2A as the B-to-B connectors 51*d*A. Each B-to-B connector 51*d*A extends in one direction along the Y-axis in plan view. The first B-to-B connector 51*d*1A is disposed between the apertures 51*c*1A and 51*c*2A, wherein the second B-to-B connector 51*d*2A is disposed between the apertures 51*c*3A and 51*c*4A.

The terminal array LF1A is formed of a plurality of terminals 51*f*1A, which are formed between the aperture 51*c*1A and the first B-to-B connector 51*d*1A, more specifically, along the rim of the aperture 51*c*1A on the direction X1 side. Likewise, the terminal array LF2A is formed of a plurality of terminals 51*f*2A, which are formed between the aperture 51*c*2A and the first B-to-B connector 51*d*1A, more specifically, along the rim of the aperture 51*c*2A on the direction X2 side. The terminal array LF3A is formed of a plurality of terminals 51*f*3A, which are formed between the aperture 51*c*3A and the second B-to-B connector 51*d*2A, more specifically, along the rim of the aperture 51*c*3A on the direction X1 side. The terminal array LF4A is formed of a plurality of terminals 51*f*4A, which are formed between the aperture 51*c*4A and the second B-to-B connector 51*d*2A, more specifically, on the rim of the aperture 51*c*4A on the direction X2 side.

The circuit board 51A includes: a plurality of wires (not illustrated) via which a plurality of terminals (not illustrated) formed in the first B-to-B connector 51*d*1A are coupled to the terminals 51*f*1A; and a plurality of wires (not illustrated) via which a plurality of terminals (not illustrated) formed in the first B-to-B connector 51*d*1A are coupled to the terminals 51*f*2A. Likewise, the circuit board 51A also includes a plurality of wires (not illustrated) for the terminals 51*f*3A and 51*f*4A.

The relay board 52A differs from the relay board 52, in including the connector 52*b*A instead of the connector 52*b* and two B-to-B connectors 52*d*A instead of the B-to-B connectors 52*d*. The connector 52*b*A differs from the connector 52*b* in extending in one direction along the X-axis.

The relay board 52A includes a third B-to-B connector 52*d*3A and a fourth B-to-B connector 52*d*4A as the B-to-B connector 52*d*A. Each B-to-B connector 52*d*A extends in one direction along the Y-axis in plan view. The third B-to-B connector 52*d*3A mates with the first B-to-B connector 51*d*1A so that the third B-to-B connector 52*d*3A is coupled to the first B-to-B connector 51*d*1A. Likewise, the fourth B-to-B connector 52*d*4A mates with the second B-to-B connector 51*d*2A so that the fourth B-to-B connector 52*d*4A is coupled to the second B-to-B connector 51*d*2A.

As illustrated in FIG. 8, the head chips 54_1A and 54_2A are disposed adjacent to each other with the first B-to-B connector 51*d*1A therebetween in plan view. Likewise, the head chips 54_3A and 54_4A are disposed adjacent to each other with the second B-to-B connector 51*d*2A therebetween in plan view. The wiring member 54*i*_1 is coupled to the terminals 51*f*1A, whereas the wiring member 54*i*_2 is coupled to the terminals 51*f*2A.

The above configuration enables a plurality of terminals 51*f*1A to be formed close to a first B-to-B connector 51*d*1A in comparison with another configuration in which a plurality of terminals 51*f*1A are not disposed between a first B-to-B connector 51*d*1A and an aperture 51*c*1A. Therefore, the first modification contributes to downsizing of a circuit board 51A in one direction vertical to the Z-axis because it is possible to use short wires to couple a plurality of terminals 51*f*1A to a first B-to-B connector 51*d*1A on the circuit board 51A. In the first modification, the head chip 54_1A is an example of a first one of head chips disposed adjacent to each other with a first board-to-board connector therebetween, whereas the head chip 54_2A is an example of a second one of the head chips disposed adjacent to each other with the first board-to-board connector therebetween. The terminal 51*cf*1A is an example of a first aperture; the terminal 51*c*2A is an example of a second aperture. The terminals 51*f*1A are an example of a plurality of first terminals; the terminals 51*f*2A are an example of a plurality of second terminals.

As illustrated in FIG. 8, the relay board 52A is smaller than the circuit board 51A as viewed in the direction Z2. Both the first B-to-B connector 51*d*1A and the second B-to-B connector 51*d*2A are disposed inside a smallest rectangle REA that encompasses all the head chips 54_1A to 54_4A, as viewed in the direction Z2. The relay board 52A overlaps or overlays one or more of the wiring members 54*i* of the head chips 54_1A to 54_4A, as viewed in the direction Z2. More specifically, the relay board 52A overlaps both the wiring members 54*i*_2 and 54*i*_3, as viewed in the direction Z2. With the first modification, the liquid ejecting head 50A can be downsized in a direction vertical to the Z-axis, as with the foregoing first embodiment.

2.2. Second Modification

Although the connector 52*b*A extends in one direction along the X-axis in the foregoing first modification, it may extend in any other direction.

Figure 9:
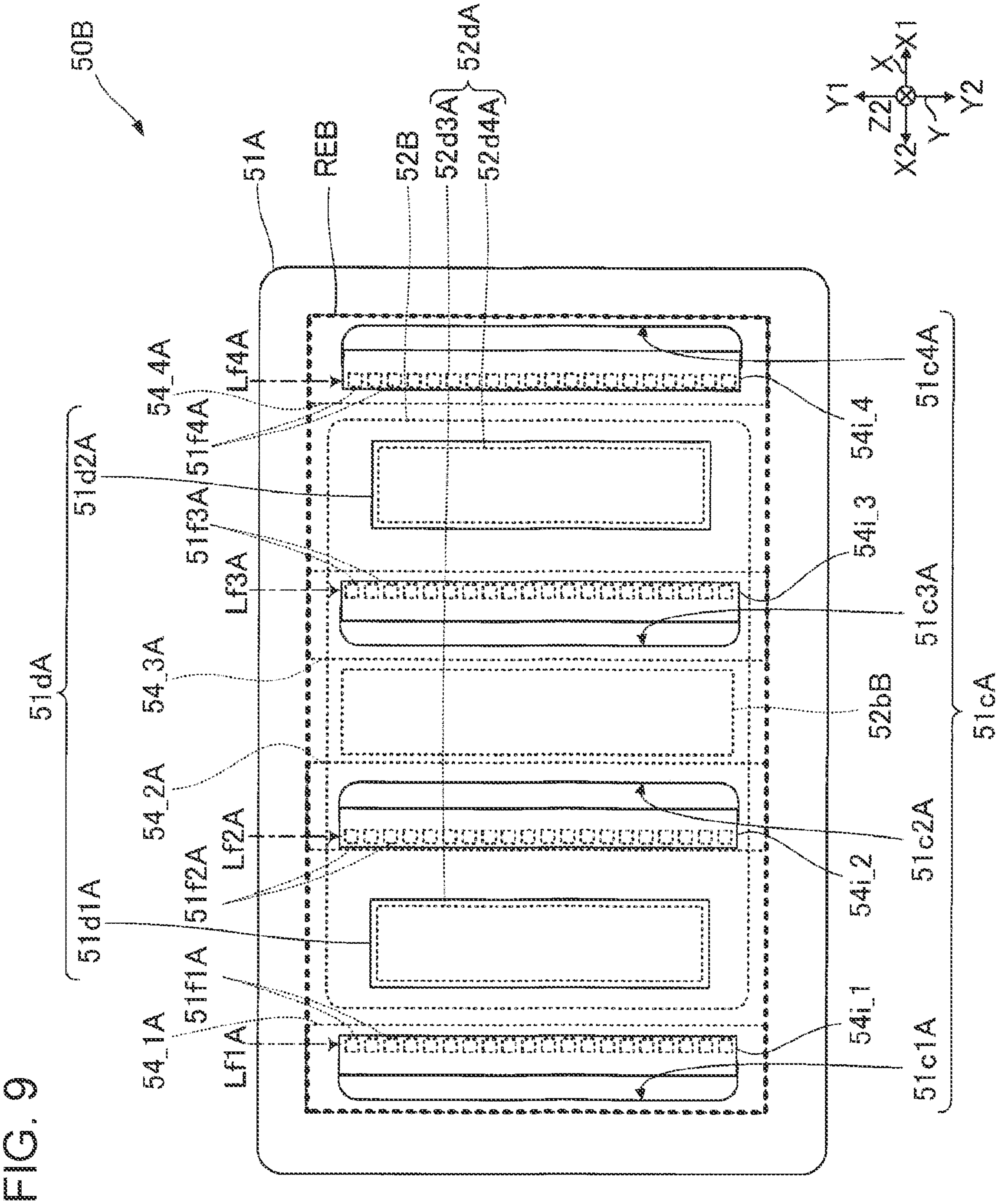
FIG. 9 is a plan view of a liquid ejecting head according to a second modification of the present disclosure.

FIG. 9 is a plan view of a liquid ejecting head 50B according to a second modification of the first embodiment. The liquid ejecting head 50B differs from the liquid ejecting head 50A in the first modification, in including a relay board 52B instead of the relay board 52A. The relay board 52B differs from the relay board 52A, in including a connector 52*b*B instead of the connector 52*b*A. The connector 52*b*B differs from the connector 52*b*A in extending along the Y-axis.

As illustrated in FIG. 9, the relay board 52B is smaller than a circuit board 51A as viewed in the direction Z2. A first B-to-B connector 51*d*1A and a second B-to-B connector

51*d*2A are disposed inside a smallest rectangle REB that encompasses head chips 54_1A to 54_4A, as viewed in the direction Z2. The relay board 52B at least partly overlaps one or more of the wiring members 54*i* of the head chips 54_1A to 54_4A, as viewed in the direction Z2. More specifically, the relay board 52B overlaps both a wiring member 54*i*_2 and a wiring member 54*i*_3, as viewed in the direction Z2. With the second modification, the liquid ejecting head 50B can be downsized in a direction vertical to the Z-axis, as with the foregoing first embodiment.

As illustrated in FIG. 9, the connector 52*b*B is disposed between the first B-to-B connector 51*d*1A and the second B-to-B connector 51*d*2A as viewed in the direction Z2. Therefore, the configuration in the second modification contributes to downsizing of the relay board 52B in comparison with another configuration in which a connector 52*b*B is not disposed between a first B-to-B connector 51*d*1A and a second B-to-B connector 51*d*2A.

2.3. Third Modification

Although the liquid ejecting head 50 has a rectangle or substantially rectangle shape in plan view in the foregoing first embodiment and first and second modifications, it may have any other shape.

Figure 10:
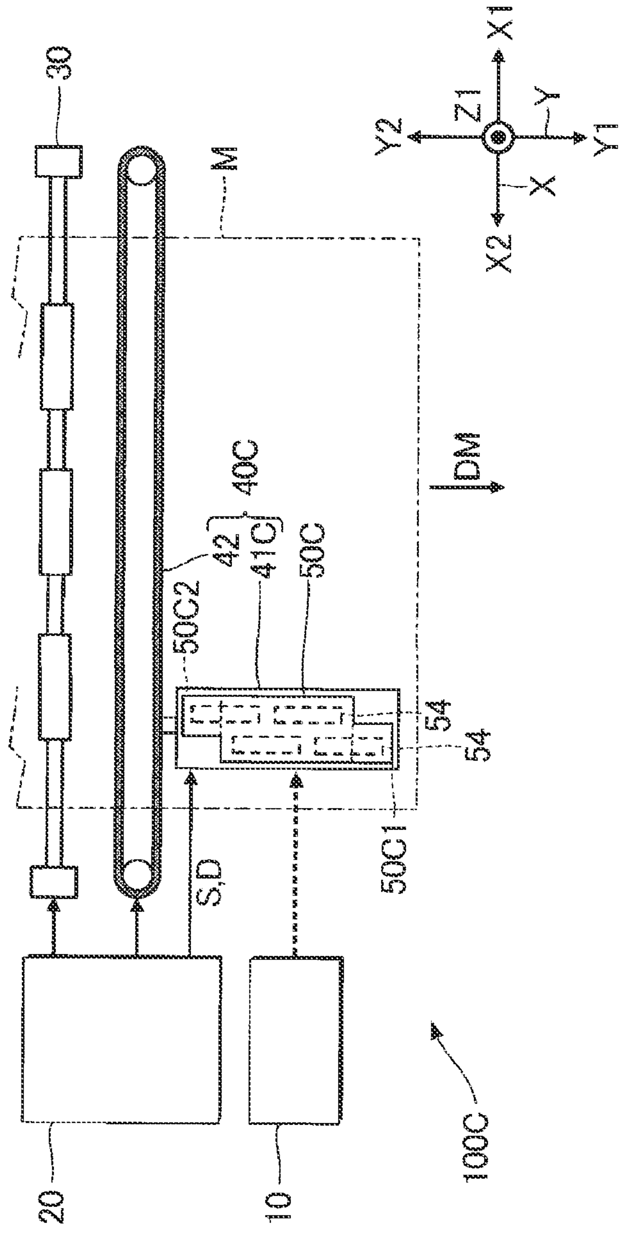
FIG. 10 is a schematic view of a liquid ejecting apparatus according to a third modification of the first embodiment.

FIG. 10 is a schematic view of a liquid ejecting apparatus 100C according to a third modification of the first embodiment. The liquid ejecting apparatus 100C differs from the liquid ejecting apparatus 100, in including a liquid ejecting head 50C instead of the liquid ejecting head 50 and a moving mechanism 40C instead of the moving mechanism 40. The liquid ejecting head 50C differs from the liquid ejecting head 50, in including a projection 50C1 that protrudes in the direction Y1 in plan view and a projection 50C2 that protrudes in the direction Y2 in plan view. The moving mechanism 40C differs from the moving mechanism 40, in including a support body 41C instead of the support body 41.

Figure 11:
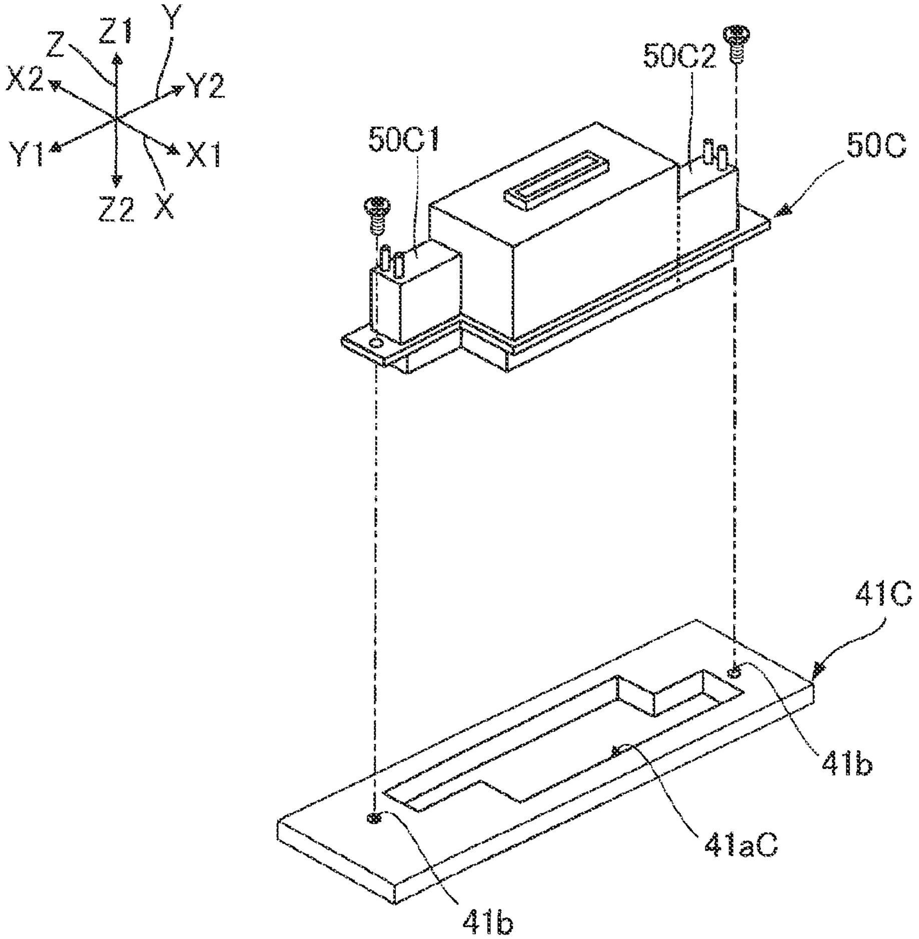
FIG. 11 is a perspective view of the liquid ejecting head and the support body according to the third modification.

FIG. 11 is a perspective view of the liquid ejecting head 50C and the support body 41C. The support body 41C differs from the support body 41, in including an aperture 41*a*C instead of the aperture 41*a*. The aperture 41*a*C differs from the aperture 41*a*, in conforming to the outer shape of the liquid ejecting head 50C.

Figure 12:
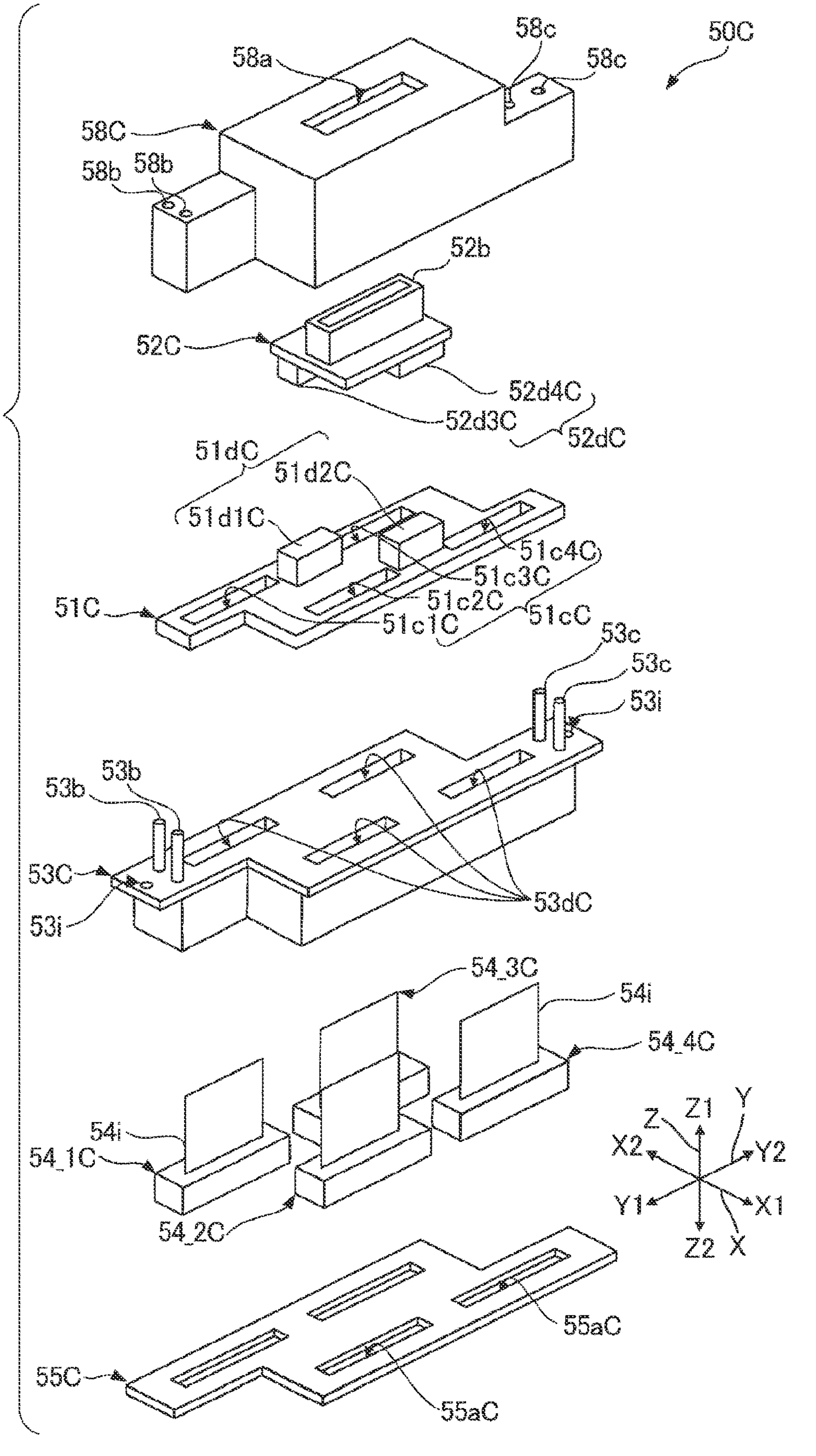
FIG. 12 is an exploded perspective view of the liquid ejecting head according to the third modification.

FIG. 12 is an exploded perspective view of the liquid ejecting head 50C. The liquid ejecting head 50C differs from the liquid ejecting head 50, in including a circuit board 51C instead of the circuit board 51; a relay board 52C instead of the relay board 52; a channel structure 53C instead of the channel structure 53; four head chips 54_1C to 54_4C instead of the head chips 54_1 to 54_4; a fixing plate 55C instead of the fixing plate 55; and a cover 58C instead of the cover 58.

The circuit board 51C differs from the circuit board 51 in including four apertures 51*c*C instead of the apertures 51*c* and two B-to-B connectors 51*d*C instead of the B-to-B connectors 51*d* and in conforming to the outer shape of the liquid ejecting head 50C. The apertures 51*c*C differ from the apertures 51*c* in that the locations of the apertures 51*c* formed on the circuit board 51C differ from those of the corresponding apertures 51*c* on the circuit board 51. The circuit board 51C includes an aperture 51*c*1C, an aperture 51*c*2C, an aperture 51*c*3C, and an aperture 51*c*4C as the apertures 51*c*C. The B-to-B connectors 51*d*C differ from the B-to-B connectors 51*d* in that the locations of the B-to-B connectors 51*d*C mounted on the circuit board 51C differ from those of the corresponding B-to-B connectors 51*d* on the circuit board 51. The B-to-B connectors 51*d*C include a first B-to-B connector 51*d*1C and a second B-to-B connector 51*d*2C.

The relay board 52C differs from the relay board 52, in including two B-to-B connectors 52*d*C instead of the B-to-B connectors 51*d* and in conforming to the outer shape of the liquid ejecting head 50C. The B-to-B connectors 52*d*C differ from the B-to-B connectors 52*d* in that the locations of the B-to-B connectors 52*d*C mounted on the relay board 52C differ from those of the corresponding B-to-B connectors 52*d* on the relay board 52. The B-to-B connectors 52*d*C include a third B-to-B connector 52*d*3C and a fourth B-to-B connector 52*d*4C.

The channel structure 53C differs from the channel structure 53, in including four apertures 53*d*C instead of the apertures 53*d*, two first channel joints 53*b*, and two second channel joints 53*c* and in conforming to the outer shape of the liquid ejecting head 50C. The apertures 53*d*C differ from the apertures 53*d* in that the locations of the apertures 53*d*C formed on the channel structure 53C differ from those of the apertures 53*d* on the channel structure 53.

The head chips 54_1C to 54_4C differ from the head chips 54_1 to 54_4 in that the locations of the head chips 54_1C to 54_4C mounted on the aperture 51*c* differ from those of the corresponding head chips 54_1 to 54_4 on the circuit board 51.

The fixing plate 55C differs from the fixing plate 55, in including four apertures 55*a*C instead of the apertures 55*a* and in conforming to the outer shape of the liquid ejecting head 50C. The apertures 55*a*C differ from the apertures 55*a* in that the locations of the apertures 55*a*C formed on the fixing plate 55C differ from those of the corresponding apertures 55*a* on the fixing plate 55.

The cover 58C differs from the cover 58, in including two through-holes 58*b* and in conforming to the outer shape of the liquid ejecting head 50C.

Figure 13:
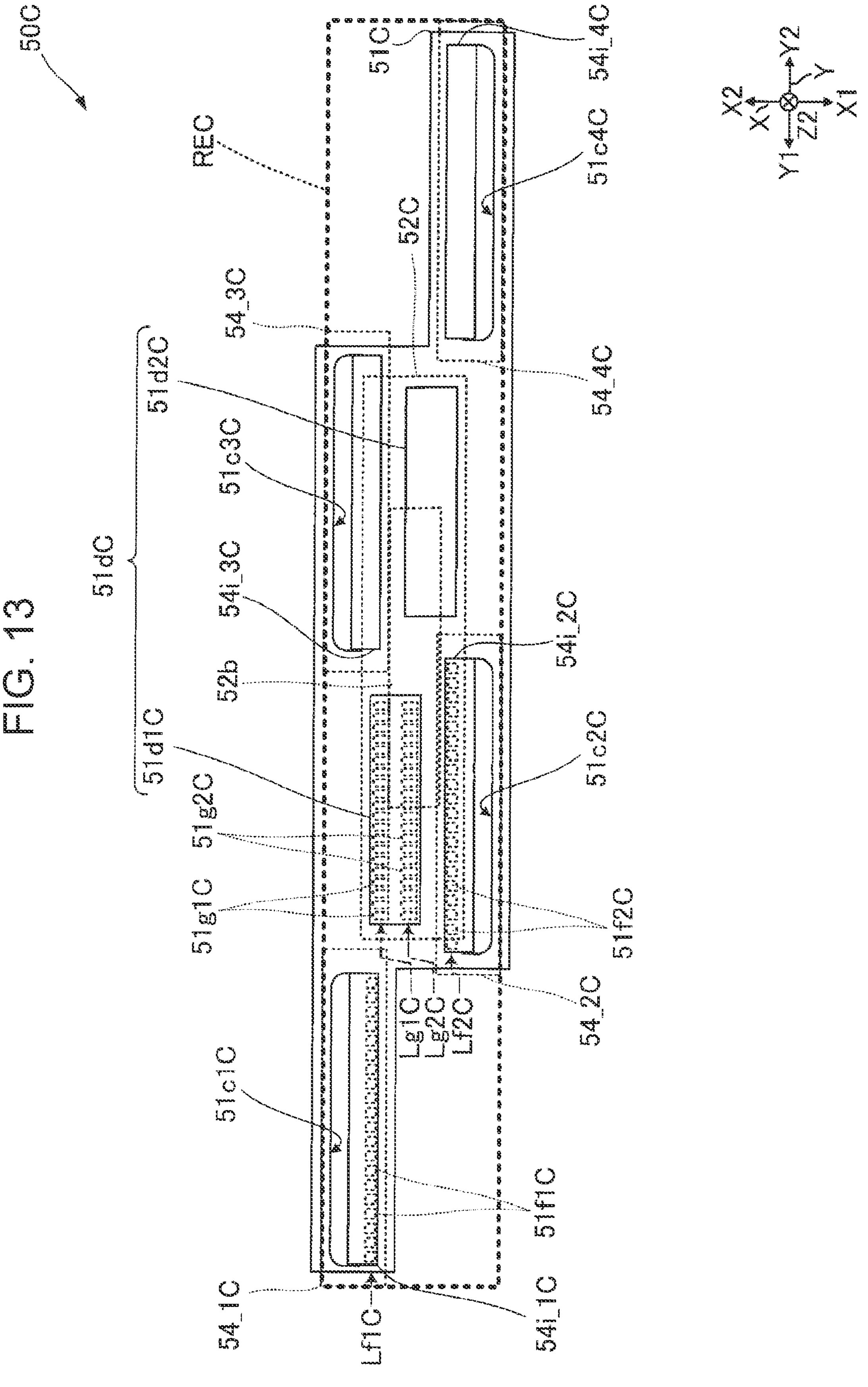
FIG. 13 is a plan view of the liquid ejecting head according to the third modification.

FIG. 13 is a plan view of the liquid ejecting head 50C. It should be noted that, in FIG. 13, the channel structure 53C and the cover 58C are not depicted and the relay board 52C and the head chips 54_1C to 54_4C are depicted only by their outlines, for the purpose of clarifying the positional relationship between the circuit board 51C, the relay board 52C, and the head chips 54_1C to 54_4C. The outlines of the head chips 54_1C to 54_4C correspond to those of cases 54*h* of the head chips 54_1 to 54_4.

As illustrated in FIG. 13, the relay board 52C is smaller than a circuit board 51C as viewed in the direction Z2. Both the first B-to-B connector 51*d*1C and the second B-to-B connector 51*d*2C are disposed inside a smallest rectangle REC that encompasses all the head chips 54_1C to 54_4C, as viewed in the direction Z2. The relay board 52C overlays or overlaps one or more of wiring members 54*i* of the head chips 54_1C to 54_4C, as viewed in the direction Z2. More specifically, the relay board 52C overlaps both a wiring member 54*i*_2C and a wiring member 54*i*_3C, as viewed in the direction Z2. With the third modification, the liquid ejecting head 50C can be downsized in a direction vertical to the Z-axis, as with the foregoing first embodiment.

As illustrated in FIG. 13, the head chips 54_1C, 54_2C, 54_3C, and 54_4C are disposed in this order in the direction Y2. In the third modification, one direction along the Y-axis, namely, the direction Y1 or Y2 is an example of a second direction. Both the head chips 54_1C and 54_3C are disposed at a substantially identical location in one direction along the X-axis. One direction along the X-axis, namely, the direction X1 or X2 is an example of a third direction. Both the head chips 54_2C and 54_4C are disposed at a substantially identical location in one direction along the X-axis. The pair of head chips 54_1C and 54_3C is shifted from the pair of head chips 54_2C and 54_4C in one direction along the X-axis. Furthermore, the head chip 54_1C is shifted from the head chip 54_2C in one direction along the Y-axis so that the head chip 54_1C overlaps the head chip 54_2C as viewed in one direction along the X-axis. Likewise, the head chip 54_2C is shifted from the head chip 54_3C in one direction along the Y-axis so that the head chip 54_2C overlaps the head chip 54_3C as viewed in one direction along the X-axis. The head chip 54_3C is shifted from the head chip 54_4C in one direction along the Y-axis so that the head chip 54_3C overlaps the head chip 54_4C as viewed in one direction along the X-axis. In short, the head chips 54_1C to 54_4C are arranged in a staggered fashion.

The first B-to-B connector **51*d*1C is electrically coupled to both the wiring member 54*i*_1C of the head chip 54_1C and the wiring member 54*i*_2C of the head chip 54_2C. The circuit board 51C includes a terminal array Lf1C formed on the direction X1 side of the aperture 51*c*1C, more specifically, along the rim of the aperture 51*c*1C on the direction X1 side; the terminal array Lf1C is formed of a plurality of terminals 51*f*1C. Alternatively, the terminal array Lf1C may be formed on the direction X2 side of the aperture 51*c*1C. In addition, the circuit board 51C further includes a terminal array Lf2C between the aperture 51*c*2C and the first B-to-B connector 51*d*1C, more specifically, along the rim of the aperture 51*c*2C on the direction X2 side; the terminal array Lf2C is formed of a plurality of terminals 51*f*2C. The wiring member 54*i*_1C is coupled to the terminals 51*f*1C, whereas the wiring member 54*i*_2C is coupled to the terminals 51*f*2C. Furthermore, the first B-to-B connector 51*d*1C includes a terminal array Lg1C and a terminal array Lg2C on the surface in the direction Z2. The terminal array Lg1C is formed of a plurality of terminals 51*g*1C, whereas the terminal array Lg2C is formed of a plurality of terminals 51*g*2C. The terminal array Lg1C is formed on the direction X2 side of the first B-to-B connector 51*d*1C in plan view, whereas the terminal array Lg2C is formed on the direction X1 side of the first B-to-B connector 51*d*1C in plan view. The terminals 51*g*1C are coupled to the respective terminals 51*f*1C on the circuit board 51C via a plurality of wires (not illustrated). In this way, the first B-to-B connector 51*d*1C is electrically coupled to the wiring member 54*i*_1C. Likewise, the terminals 51*g*2C are coupled to the respective terminals 51*f*2C on the circuit board 51C via a plurality of wires (not illustrated). In this way, the first B-to-B connector 51*d*1C is electrically coupled to the wiring member 54*i*_2C. Similar to the first B-to-B connector 51*d*1C, the second B-to-B connector 51*d*2C are also electrically coupled to both the wiring member 54*i*_3C of the head chip 54_3C and the wiring member 54*i*_4C of the head chip 54_4**C (not illustrated).

The third modification efficiently utilizes empty regions to contribute to downsizing of the liquid ejecting head 50C in a direction vertical to the Z-axis. This is because the configuration allows the two B-to-B connectors **51*dc* to be disposed within respective empty regions that are defined by the head chips 54_1C to 54_4C arranged in a staggered fashion, more specifically, to be disposed between the wiring members 54*i*_1C and 54*i*_3C and the wiring members 54*i*_2C and 54*i*_4**C.

2.4. Fourth Modification

Although the circuit board 51 is provided with the four apertures **51*c* through which the respective wiring members 54*i* pass in the foregoing first embodiment and first to third modifications, it does not necessarily have to have four apertures. Alternatively, it has notches instead of some of the apertures 51*c***.

Figure 14:
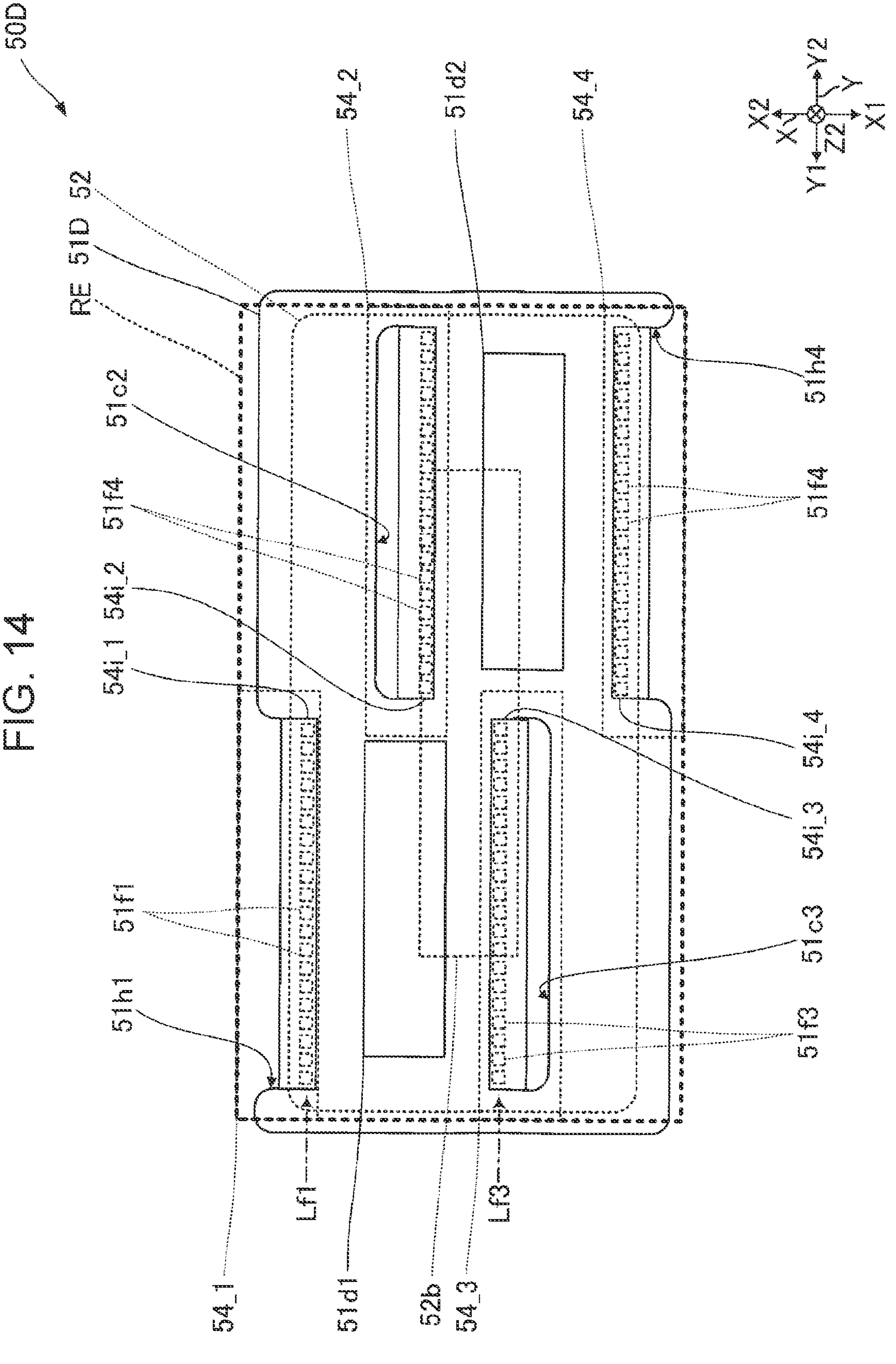
FIG. 14 is a schematic view of a liquid ejecting apparatus according to a fourth modification of the first embodiment.

FIG. 14 is a plan view of a liquid ejecting head 50D according to a fourth modification of the first embodiment. The liquid ejecting head 50D differs from the liquid ejecting head 50, in including a circuit board 51D instead of the circuit board 51. The circuit board 51D differs from the circuit board 51 in including a notch **51*h*1 instead of the aperture 51*c*1 and a notch 51*h*4 instead of the aperture 51*c*4**.

The notch **51*h*1 is formed along the rim of the circuit board 51D on the direction X2 side so as to be depressed in the direction X1. The notch 51*h*1 allows a wiring member 54*i*_1 of a head chip 54_1 to pass therethrough. The expression "a notch allows an object to pass therethrough" means that a notch allows an object to pass through the space created by the notch. A plurality of terminals 51*f*1 are formed between a first B-to-B connector 51*d*1 and the notch 51*h*1 and are coupled to a wiring member 54*i*_1. In the fourth modification, a head chip 54_3 is an example of a first one of head chips disposed adjacent to each other with a first board-to-board connector therebetween, whereas the head chip 54_1 is an example of a second one of the head chips disposed adjacent to each other with the first board-to-board connector therebetween. An aperture 51*c*3 is an example of a first aperture, whereas a plurality of terminals 51*f*3 are an example of a plurality of first terminals. The terminals 51*f*1** are an example of a plurality of second terminals disposed between a notch and a first board-to-board connector.

Similar to the notch **51*h*1, the notch 51*h*4 is formed along the rim of the circuit board 51D on the direction X1 side so as to be depressed in the direction X2. The notch 51*h*4 allows a wiring member 54*i*_4 of a head chip 54_4 to pass therethrough. A plurality of terminals 51*f*4 are formed between a second B-to-B connector 51*d*2 and the notch 51*h*4 and are coupled to the wiring member 54*i*_4**.

The fourth modification enables a plurality of terminals **51*f*1 to be formed close to a first B-to-B connector 51*d*1 in comparison with another configuration in which a plurality of terminals 51*f*1 are not disposed between a first B-to-B connector 51*d*1 and a notch 51*h*1. Similar to the first embodiment, the fourth modification, therefore, contributes to downsizing of a circuit board 51D in one direction vertical to the Z-axis because it is possible to use short wires to couple a plurality of terminals 51*f*1 to a first B-to-B connector 51*d*1 on the circuit board 51**D.

2.5. Fifth Modification

Although a channel structure 53 has a plurality of apertures **53*d* through which respective wiring members 54*i* pass in the foregoing first embodiment and first to fourth modifications, it does not necessarily have to have such apertures. Alternatively, the channel structure 53 may have one or more notches through which some of the wiring members 54*i*** pass.

2.6. Sixth Modification

Although a length dy4 of a relay board 52B in one direction along the Y-axis is longer than a length dy3 of a first B-to-B connector **51*d*1 in one direction along the Y-axis in the foregoing first embodiment, the length dy4 does not necessarily have to be longer than the length dy3. Alternatively, the length dy4 may be substantially the same as or shorter than the length dy3**.

2.7. Seventh Modification

Although a liquid ejecting head 50 has four head chips 54 in the foregoing first embodiment, it does not necessarily have to have four head chips. Alternatively, the liquid ejecting head 50 may have at least two head chips. If the liquid ejecting head 50 has two head chips 54, a first B-to-B connector 51*d*1 may be electrically coupled to a wiring member 54*i* of one of the head chips 54, and a second B-to-B connector 51*d*2 may be electrically coupled to a wiring member 54*i* of the other head chip 54. Moreover, the same number of head chips 54 may be electrically coupled to each of the first B-to-B connector 51*d*1 and the second B-to-B connector 51*d*2. Alternatively, different numbers of head chips 54 may be electrically coupled to the first B-to-B connector 51*d*1 and the second B-to-B connector 51*d*2.

2.8. Eighth Modification

The foregoing first embodiment and first to seventh modifications provide serial types of liquid ejecting apparatuses 100, 100A, and 100C, which are configured to move a support body 41 that supports a liquid ejecting head 50 in two opposite directions. However, the present disclosure may be applicable to line types of liquid ejecting apparatuses with a plurality of nozzles N arranged across a medium M. In short, the support body 41 that supports the liquid ejecting head 50 is not limited to a serial type of carriage. Alternatively, the support body 41 may also be a line type of structure that supports the liquid ejecting head 50. In such cases, a plurality of liquid ejecting heads 50 may be arrayed along the width of a medium M while collectively supported by a single support body.

2.9. Ninth Modification

The foregoing first embodiment and first to eighth modifications provide serial types of liquid ejecting apparatuses 100, 100A, and 100C, which are used for a printing application. However, they may be used for other applications, such as faxing and copying applications. As some alternative examples, the liquid ejecting apparatuses 100, 100A, and 100C may be used as color filter manufacturing apparatuses, which are configured to fabricate color filters for display devices such as liquid crystal panels by discharging a solution containing a color material. The liquid ejecting apparatuses 100, 100A, and 100C may also be used as wire/electrode manufacturing apparatuses, which are configured to fabricate wires and/or electrodes for circuit boards by discharging a solution containing a conductive material. The liquid ejecting apparatuses 100, 100A, and 100C may also be used as biochip manufacturing apparatuses, which are configured to fabricate biochips by discharging a solution containing a living-body-related organic substance.

3. Supplementary Note

Some aspects conceivable from the foregoing configurations will be described below.

According to aspect 1, which is a proper aspect, a liquid ejecting head includes: a plurality of head chips that discharge liquid in a first direction; a first board that is a rigid board coupled to a plurality of flexible boards mounted on the respective head chips; and a second board disposed opposite the plurality of head chips with the first board therebetween, the second board being a rigid board provided with a connector to be coupled to an external wiring member. The first board has a first board-to-board connector coupled to the second board and a second board-to-board connector coupled to the second board. The second board has a third board-to-board connector coupled to the first board and a fourth board-to-board connector coupled to the first board. The first board-to-board connector mates with the third board-to-board connector so that the first board-to-board connector is coupled to the third board-to-board connector. The second board-to-board connector mates with the fourth board-to-board connector so that the second board-to-board connector is coupled to the fourth board-to-board connector. The connector is electrically coupled to both the third board-to-board connector and the fourth board-to-board connector.

In aspect 1, two board-to-board connectors are combined by a second board into a single connector. This configuration enables the liquid ejecting head to be coupled to an external wiring member via a small number of connectors. In addition, using four board-to-board connectors enables both the first board and the second board to be retained in substantially parallel to each other. With aspect 1, the liquid ejecting head can be downsized in the first direction in comparison with another aspect in which a second board is retained vertically to a first board.

According to aspect 2, which is a concrete example of aspect 1, the second board may be smaller than the first board as viewed in the first direction.

With aspect 2, the liquid ejecting head can be downsized in a direction vertical to the first direction in comparison with another aspect in which a second board is larger than a first board.

According to aspect 3, which is a concrete example of aspect 1 or 2, both the first board-to-board connector and the second board-to-board connector may be disposed inside a smallest rectangle that encompasses all the head chips, as viewed in the first direction.

If at least a portion of a first board-to-board connector or a second board-to-board connector is disposed outside the rectangle, a liquid ejecting head may be upsized in the first direction due to this portion. With aspect 3, the liquid ejecting head can be downsized in a direction vertical to the first direction in comparison with another aspect in which a first board-to-board connector or a second board-to-board connector is at least partly disposed outside the rectangle as viewed in the first direction.

According to aspect 4, which is a concrete example of one of aspects 1 to 3, the second board may overlap or overlay one or more of the plurality of flexible boards as viewed in the first direction.

If a second board does not overlap any of the flexible boards as viewed in the first direction, the liquid ejecting head may be upsized in the first direction due to this nonoverlapped flexible board. With aspect 4, the liquid ejecting head 50 can be downsized in the direction vertical to the Z-axis in comparison with another aspect in which the second board does not overlap any flexible board as viewed in the first direction.

According to aspect 5, which is a concrete example of one of aspects 1 to 4, the liquid ejecting head may further include a channel structure through which the liquid is supplied to the plurality of head chips. The channel structure may be disposed between the first board and the plurality of head chips. The channel structure may have a plurality of apertures through which the respective flexible boards pass.

With aspect 5, the flexible boards can be coupled to the first board by passing the flexible boards through respective apertures. It is thus unnecessary to excessively route the flexible boards.

According to aspect 6, which is a concrete example of aspect 5, the channel structure may have a plurality of channel joints to be coupled to an external channel member. The plurality of channel joints may include a first channel joint and a second channel joint disposed apart from each other in a direction orthogonal to the first direction. The first board may be disposed between the first channel joint and the second channel joint in the direction orthogonal to the first direction.

According to aspect 7, which is a concrete example of one of aspects 1 to 6, the plurality of head chips may include a first head chip and a second head chip disposed adjacent to each other with the first board-to-board connector therebetween as viewed in the first direction. The first board may include: a first aperture through which the flexible board of the first head chip passes; a second aperture through which the flexible board of the second head chip passes; a plurality of first terminals formed between the first board-to-board connector and the first aperture; and a plurality of second terminals formed between the first board-to-board connector and the second aperture. The flexible board of the first head chip may be coupled to the plurality of first terminals, and the flexible board of the second head chip may be coupled to the plurality of second terminals.

With aspect 7, the distance between the first board-to-board connector and each terminal can be shortened in comparison with another aspect in which a plurality of first terminals are not formed between a first board-to-board connector and a first aperture. Therefore, aspect 7 contributes to downsizing of the first board in the direction vertical to the first direction because it is possible to couple the plurality of first terminals to the first board-to-board connector on the first board via short wires.

According to aspect 8, which is a concrete example of one of aspects 1 to 6, the plurality of head chips may include a first head chip and a second head chip disposed adjacent to each other with the first board-to-board connector therebetween as viewed in the first direction. The first board may include: a first aperture through which the flexible board of the first head chip passes; a notch through which the flexible board of the second head chip passes; a plurality of first terminals formed between the first board-to-board connector and the first aperture; and a plurality of second terminals formed between the first board-to-board connector and the notch. The flexible board of the first head chip may be coupled to the plurality of first terminals, and the flexible board of the second head chip may be coupled to the plurality of second terminals.

With aspect 7, the distance between the first board-to-board connector and the plurality of terminals can be shortened in comparison with another aspect in which a plurality of first terminals are not formed between a first board-to-board connector and a notch. Therefore, aspect 8 contributes to downsizing of the first board in the direction vertical to the first direction because it is possible to couple the plurality of second terminals to the first board-to-board connector on the first board via short wires.

According to aspect 9, which is a concrete example of one of aspects 1 to 6, the plurality of head chips may include a first head chip, a second head chip, a third head chip, and a fourth head chip. The first head chip may have a first flexible board; the second head chip may have a second flexible board; the third head chip may have a third flexible board; and the fourth head chip may have a fourth flexible board. The first head chip, the second head chip, the third head chip, and the fourth head chip may be disposed in this order in a second direction, the second direction being orthogonal to the first direction. The first head chip and the third head chip may be disposed in a substantially identical location in a third direction, the third direction being orthogonal to both the first direction and the second direction. The second head chip and the fourth head chip may be disposed in a substantially identical location in the third direction. The first head chip may be shifted from the second head chip in the third direction so that the first head chip overlaps the second head chip as viewed in the second direction. The first board-to-board connector may be disposed between the first flexible board and the third flexible board; the second board-to-board connector may be disposed between the second flexible board and the fourth flexible board.

With aspect 9, a first board-to-board connector can be disposed between a first flexible board and a third flexible board, and a second board-to-board connector can be disposed between a second flexible board and a fourth flexible board. This configuration efficiently utilizes empty regions to contribute to downsizing of the liquid ejecting head in a direction vertical to the first direction.

According to aspect 10, which is a concrete example of one of aspects 1 to 6, the plurality of head chips may include a first head chip, a second head chip, a third head chip, and a fourth head chip. The first head chip may have a first flexible board; the second head chip may have a second flexible board; the third head chip may have a third flexible board; and the fourth head chip may have a fourth flexible board. The first head chip, the second head chip, the third head chip, and the fourth head chip may be disposed in this order in a second direction, the second direction being orthogonal to the first direction. The first head chip and the third head chip may be disposed in a substantially identical location in a third direction, the third direction being orthogonal to both the first direction and the second direction. The second head chip and the fourth head chip may be disposed in a substantially identical location in the third direction. The first head chip may be shifted from the second head chip in the third direction. The first head chip may be shifted from the second head chip in the second direction so that the first head chip overlaps the second head chip as viewed in the third direction. The second head chip may be shifted from the third head chip in the second direction so that the second head chip overlaps the third head chip as viewed in the third direction. The third head chip may be shifted from the fourth head chip in the second direction so that the third head chip overlaps the fourth head chip as viewed in the third direction. The first board-to-board connector may be disposed between the first flexible board and the third flexible board; the second board-to-board connector may be disposed between the second flexible board and the fourth flexible board.

With aspect 10, a first board-to-board connector can be disposed between a first flexible board and a third flexible board, and a second board-to-board connector can be disposed between a second flexible board and a fourth flexible board. This configuration efficiently utilizes empty regions to contribute to downsizing of the liquid ejecting head in a direction vertical to the first direction.

According to aspect 11, which is a concrete example of one of aspects 1 to 10, the connector may be disposed between the first board-to-board connector and the second board-to-board connector or may overlap the first board-to-board connector and the second board-to-board connector as viewed in the first direction.

Aspect 11 contributes to downsizing of the second board in comparison with another aspect in which a connector does not overlap a first board-to-board connector or a second board-to-board connector.

According to aspect 12, which is a concrete example of one of aspects 1 to 11, the flexible board mounted on one of the plurality of head chips may have a first terminal array coupled to the first board, the first terminal array being formed of a plurality of third terminals arranged in a fourth direction, the fourth direction being orthogonal to the first direction. The first board-to-board connector may have a second terminal array coupled to the first board, the second terminal array being formed of a plurality of fourth terminals arranged in the fourth direction. A length of the second terminal array in the fourth direction may be shorter than a length of the first terminal array in the fourth direction.

With aspect 12, the length of a terminal array can be shortened using a board-to-board connector in comparison with another aspect in which a terminal array is coupled to a second board via a flexible board. This configuration contributes to downsizing of a first board in a direction vertical to the first direction.

According to aspect 13, which is a concrete example of one of aspects 1 to 12, a length of the connector in the fourth direction may be longer than a length of the first board-to-board connector in the fourth direction.

According to aspect 13, which is a concrete example of aspect 14, a thickness direction of the first board may be substantially identical to a thickness direction of the second board.

With aspect 14, the liquid ejecting head can be downsized in the first direction in comparison with another aspect in which the thickness directions of the first board and the second board are nonidentical.

According to aspect 15, which is another proper aspect, a liquid ejecting apparatus includes: the liquid ejecting head according to one of aspects 1 to 14; and the external wiring member that is disposed outside the liquid ejecting head and that is coupled to the connector of the liquid ejecting head.

Aspect 15 provides a liquid ejecting apparatus that has a liquid ejecting head downsized in the first direction in comparison with another aspect in which a second board is retained vertically to a first board.

What is claimed is:

1. A liquid ejecting head comprising:

head chips configured to eject liquid in a first direction;

a first board that is a rigid board coupled to flexible boards mounted on the respective head chips; and a second board being a rigid board provided with a connector to be coupled to an external wiring member, wherein the first board is located between the head chips and the second board, the first board has a first board-to-board connector coupled to the second board and a second board-to-board connector coupled to the second board, the second board has a third board-to-board connector coupled to the first board and a fourth board-to-board connector coupled to the first board, the first board-to-board connector mates with the third board-to-board connector so that the first board-to-board connector is coupled to the third board-to-board connector, the second board-to-board connector mates with the fourth board-to-board connector so that the second board-to-board connector is coupled to the fourth board-to-board connector, and the connector is electrically coupled to both the third board-to-board connector and the fourth board-to-board connector.

2. The liquid ejecting head according to claim 1, wherein the second board is smaller than the first board as viewed in the first direction.

3. The liquid ejecting head according to claim 1, wherein both the first board-to-board connector and the second board-to-board connector are disposed inside a smallest rectangle that encompasses all the head chips, as viewed in the first direction.

4. The liquid ejecting head according to claim 1, wherein when viewed in the first direction, the second board overlaps partially one or more of the flexible boards or overlaps entirely one or more of the flexible boards.

5. The liquid ejecting head according to claim 1, further comprising a channel structure through which the liquid is supplied to the head chips, the channel structure being disposed between the first board and the head chips, the channel structure having apertures through which the respective flexible boards pass.

6. The liquid ejecting head according to claim 5, wherein the channel structure has channel joints to be coupled to an external channel member, the channel joints include a first channel joint and a second channel joint disposed apart from one another in a direction orthogonal to the first direction, and the first board is disposed between the first channel joint and the second channel joint in the direction orthogonal to the first direction.

7. The liquid ejecting head according to claim 1, wherein the head chips include a first head chip and a second head chip disposed adjacent to one another with the first board-to-board connector therebetween as viewed in the first direction, the first board includes a first aperture through which the flexible board of the first head chip passes, a second aperture through which the flexible board of the second head chip passes, first terminals formed between the first board-to-board connector and the first aperture, and second terminals formed between the first board-to-board connector and the second aperture, and the flexible board of the first head chip is coupled to the first terminals, and the flexible board of the second head chip is coupled to the second terminals.

8. The liquid ejecting head according to claim 1, wherein the head chips include a first head chip and a second head chip disposed adjacent to one another with the first board-to-board connector therebetween as viewed in the first direction, the first board includes a first aperture through which the flexible board of the first head chip passes, a notch through which the flexible board of the second head chip passes, first terminals formed between the first board-to-board connector and the first aperture, and second terminals formed between the first board-to-board connector and the notch, and the flexible board of the first head chip is coupled to the first terminals, and the flexible board of the second head chip is coupled to the second terminals.

9. The liquid ejecting head according to claim 1, wherein the head chips include a first head chip, a second head chip, a third head chip, and a fourth head chip, the first head chip has a first flexible board, the second head chip has a second flexible board, the third head chip has a third flexible board, the fourth head chip has a fourth flexible board, the first head chip, the second head chip, the third head chip, and the fourth head chip are disposed in this order in a second direction, the second direction being orthogonal to the first direction, the first head chip and the third head chip are disposed in a substantially identical location in a third direction, the third direction being orthogonal to both the first direction and the second direction, the second head chip and the fourth head chip are disposed in a substantially identical location in the third direction, the first head chip is shifted from the second head chip in the third direction so that the first head chip overlaps partially the second head chip as viewed in the second direction, the first board-to-board connector is disposed between the first flexible board and the third flexible board, and the second board-to-board connector is disposed between the second flexible board and the fourth flexible board.

10. The liquid ejecting head according to claim 1, wherein the head chips include a first head chip, a second head chip, a third head chip, and a fourth head chip, the first head chip has a first flexible board, the second head chip has a second flexible board, the third head chip has a third flexible board, the fourth head chip has a fourth flexible board, the first head chip, the second head chip, the third head chip, and the fourth head chip are disposed in this order in a second direction, the second direction being orthogonal to the first direction, the first head chip and the third head chip are disposed in a substantially identical location in a third direction, the third direction being orthogonal to both the first direction and the second direction, the second head chip and the fourth head chip are disposed in a substantially identical location in the third direction, the first head chip is shifted from the second head chip in the third direction, the first head chip is shifted from the second head chip in the second direction so that the first head chip overlaps partially the second head chip as viewed in the third direction, the second head chip is shifted from the third head chip in the second direction so that the second head chip overlaps partially the third head chip as viewed in the third direction, the third head chip is shifted from the fourth head chip in the second direction so that the third head chip overlaps the fourth head chip as viewed in the third direction, the first board-to-board connector is disposed between the first flexible board and the third flexible board, and the second board-to-board connector is disposed between the second flexible board and the fourth flexible board.

11. The liquid ejecting head according to claim 1, wherein the connector is disposed between the first board-to-board connector and the second board-to-board connector or overlaps the first board-to-board connector and the second board-to-board connector as viewed in the first direction.

12. The liquid ejecting head according to claim 1, wherein the flexible board mounted on one of the head chips has a first terminal array coupled to the first board, the first terminal array being formed of third terminals arranged in a fourth direction, the fourth direction being orthogonal to the first direction, the first board-to-board connector has a second terminal array coupled to the first board, the second terminal array being formed of fourth terminals arranged in the fourth direction, and a length of the second terminal array in the fourth direction is shorter than a length of the first terminal array in the fourth direction.

13. The liquid ejecting head according to claim 12, wherein a length of the connector in the fourth direction is longer than a length of the first board-to-board connector in the fourth direction.

14. The liquid ejecting head according to claim 1, wherein a thickness direction of the first board is substantially identical to a thickness direction of the second board.

15. A liquid ejecting apparatus comprising:

the liquid ejecting head according to claim 1; and the external wiring member that is disposed outside the liquid ejecting head and that is coupled to the connector of the liquid ejecting head.

* * * * *